US006057858A

United States Patent [19]

Desrosiers

[11] Patent Number: 6,057,858

[45] Date of Patent: May 2, 2000

[54] MULTIPLE MEDIA FONTS

[76] Inventor: John J. Desrosiers, 11693 San Vicente Blvd., Suite 495, Los Angeles, Calif. 90049

[21] Appl. No.: 08/689,510

[22] Filed: Aug. 7, 1996

[51] Int. Cl.[7] .................................................... G06F 15/00

[52] U.S. Cl. ............................................................. 345/467

[58] Field of Search .................................... 345/467, 431, 345/470, 471, 150

[56] References Cited

U.S. PATENT DOCUMENTS

| 5,295,239 | 3/1994 | Murakami | 395/151 |
| 5,410,647 | 4/1995 | Peaslee et al. | 395/150 |
| 5,771,371 | 6/1998 | Morse et al. | 395/501 |

OTHER PUBLICATIONS

"Macromedia Fontographer" p.p. 2, 327, Jan. 1996.
"Macromedia Director Power Toolkit" p. 2–6, 203–211, 1996.
"Photoshop Type Magic" p.p. 1–13, 36–37, 52–53, 1995.
"Corel Draw Design Workshop" pp. 65–65–68, 70–71, 110–118, 129, 132, and 213–222, 1995.
"CorelDraw"; pp. 2–14 "Corel Dream 3D" (including E.1–E.2, E.48–E57, E.82–83, and E.118–E.125); pp. 15–19 "Corel Motion 3D" (including F1–F6); and pp. 20–30 "Corel Depth" (including G1–G19), 1995.
The "Readme file from a Demo copy of Art Importer" posted on the DTP forum of CompuServe; p. 3 "Art Importer" Demo font, 1996.
"Help" file of Corel Depth V6.0 from the "Corel Draw" Collection V6.0 Build 169 Dec. 6, 1995; "screen captures" of file operations in "Corel Depth".
"Help" file of "Microsoft Word Art 2.0" from Microsoft Word 6.0A for Windows, 1992, pp. 1–5.
"Screen captures" of operations using "Instant 3D," Version 1.0 Copyright 1995 Visual Software, Inc. and pp. 3–8 are from the "Help" file of "Instant 3D", pp. 1–8.
"The Print Shop 2.0.1," Broderbund Software, and "screen captures" of operations using "The Print Shop 2.0.1", 1992, pp. 50–59, 144–145.
"Help" file of "Printmaster Gold" V2.10.34, Micrologic Software and p. 2 is a "screen capture" of an operation using "Printmaster Gold", 1996.

*Primary Examiner*—Phu K. Nguyen
*Attorney, Agent, or Firm*—Michael B. Einschlag

[57] ABSTRACT

Method and apparatus for rendering characters on one or more output devices using multiple media fonts; one type of a multiple media font being a multiple color font ("MCF"). An MCF is a scalable font (a font used to render characters in multiple sizes and output device pixel resolutions) that enables the use of one or more types of color scheme (color design) data and character shape data in conjunction with one or more types of transformation data (shapes and visual looks) to render characters. Inventive multiple media fonts can be embodied for use: (a) in coordination with present operating systems; (b) as an annex to applications programs; (c) in coordination with, or as an integral part of, an operating-environment; and (d) over the Internet or other computer networks.

62 Claims, 7 Drawing Sheets

Vermont

RockNRoll

Raining

24Karat

MULTIPLE MEDIA FONTS

TECHNICAL FIELD OF THE INVENTION

The present invention relates to method and apparatus for rendering characters on one or more output devices using multiple media fonts; one type of a multiple media font being a multiple color font ("MCF"). In accordance with the present invention, an MCF is a scalable font (a font used to render characters in multiple sizes and output device pixel resolutions) that enables the use of one or more types of color scheme (color design) data and character shape data in conjunction with one or more types of transformation data (shapes and visual looks) to render the characters. Such MCFs produce, for example, a red letter with a black dropshadow behind it, a letter which fades from blue to yellow, top to bottom, and so forth. In the following, the term media output refers to visual output, auditory output, olfactory output and so forth and the term color is not confined to color as in the sense of red, white, or blue, but is used in a computer-graphics sense of color where every shade, intensity and transparency of every hue is a considered to be a different color.

BACKGROUND OF THE INVENTION

Fonts provide a mapping between symbolic codes representing characters (letters, numerals, diacritical marks, typographic ornaments, and the like) and visual shapes. For example, the letter "A" is represented by the number 65 in the ASCII symbol set. Different fonts are used to express different type faces and styles that represent the same characters. In current computer-graphics practice, fonts are special objects known to a graphics subsystem. Further, in accordance with current computer-graphics practice, a set of fonts is available to user programs (also known as application programs) which use the given graphics subsystem via a set of definitions known as application program interfaces ("APIs"). The APIs define how a user program (or application program) selects appearance characteristics for rendering characters, such as type style, font face, size, color, and so forth. Then, using appropriate APIs, the user program requests the graphics subsystem to print/display, i.e., render, characters or text at a given position on an output device according to previously-selected appearance characteristics.

FIG. 1. shows an environment in which display and keyboard 100 are connected to processor and memory 200. Processor and memory 200 are connected to storage 300 and printer 400. As shown in FIG. 1, processor and memory 200 contain application program 210 and operating-environment 220 which interact with each other using predetermined APIs, which APIs are shown symbolically in FIG. 1 as API 230. As further shown in FIG. 1, fonts 310 are stored on storage 300. As is well known in the art, fonts 310 are accessed by application program 210 by making an appropriate call to operating-environment 220 using an appropriate one of the predetermined APIs. Operating-environment 220 causes fonts 310 to render a character for display on display 100 and/or printer 400.

In the prior art, in addition to appearance characteristics such as type style, font face, size and so forth, the application program must select color because a typical prior art font does not have embedded color. In this respect, a typical prior art font is like a rubber stamp that has no color of its own, i.e., with a rubber stamp characters are rendered in the color of the ink pad used to "paint" the rubber stamp. By analogy, a rubber stamp can render different colors by painting it with different inks and the same is true of typical prior art fonts.

There are many widely-used font technologies in the prior art but, in general, they break down into four basic font types. Although a few prior art fonts are hybrids of the four basic font types, that does not materially change the following discussion.

The first basic prior art font type is referred to as a bitmapped font. In accordance with this technology, a digital "picture" of a rendering of each letter in the alphabet is stored in a given size for a specific output resolution, style, and so forth. Typically, each digital picture is represented as an array of bits, with, for example, "1" bits representing positions in the array for a selected color to appear and "0" bits representing positions in the array for no color to appear. A few bitmapped fonts were produced and sold for use with Apple™ systems that contained color information for each position in the font. For those fonts, user-program-specified color information was simply ignored. Bitmapped fonts are problematic because they are only suitable for one size at one display resolution, i.e., they cannot be scaled.

The second basic prior art font type is referred to as a pure-outline font. Pure-outline fonts contain coded mathematical formulas and equations that describe the outlines. i.e., the shapes, of the edges of each character. These outlines are analogous to tiny dikes enclosing an area into which one would pour ink to render the completed character. In use, a font subsystem first mathematically converts the outlines to a requested size. Then, the font subsystem determines which pixels are inside the outlines. Finally, the font subsystem marks the output device in a user-selected color. As is well known, pure-outline fonts often contain "hinting" data that is used by the font subsystem, for example, to adjust small characters to make them more pleasing to the eye. In addition, pure-outline fonts are classified as "scalable," meaning that the same font description can be shrunk or enlarged, for example, mathematically, to describe the font in different sizes or in different hardware pixel resolutions.

The pure-outline font is today's dominant font technology, typified by Apple™ TrueType™ fonts and Adobe™ PostScript™ programming language Type 1 format fonts. As is well known, the PostScript™ programming language is a general purpose computer language which has a built-in graphics environment (see a book by Adobe Systems Incorporated entitled "PostScript Language Reference Manual"—Second Edition, Addison-Wesley, 1990. ISBN 0-201-18127-4 for a description of the PostScript™ programming language). In Apple™ Macintosh™ and Windows™ PC based operating systems, the PostScript™ programming language is typically built into special printers or printer accessories, however, software emulators and on-screen pre-viewers are also available. In use in such operating systems, the operating system and device driver software collaborate automatically to construct a PostScript™ programming language program file (such program file typically includes embedded data such as ASCII versions of text to be rendered) that fully describes an entire page to be rendered. Then, the operating system causes the device driver to download the PostScript™ programming language program file, along with any other necessary files, to the printer which, in turn, executes the PostScript™ programming language program file and prints the result. A PostScript™ programming language embodiment of a font is problematic for Apple™ Macintosh™ and Windows™ PC based operating systems because these PostScript™ programming language fonts are not built into these operating systems and, hence, cannot provide live, as-you-edit display (however, some UNIX™ based operating systems support live, as-you edit display of PostScript™ programming language fonts). It should be noted, however, that a prior art product called the Adobe™ Type Manager ("ATM") for use with Windows™ PC and Apple™ Macintosh™ platforms, enables any application program to utilize the above-described pure-outline, PostScript™ programming language Type 1 format fonts as if they were native to the platform, despite the fact that Microsoft™ and Apple™ do not support these fonts. When the ATM is loaded, it intercepts font-related operating system calls and monitors them for an operating system request that uses a font name that the ATM recognizes as relating to a Type 1 format font. In that case, the ATM does not pass the request to the native font subsystem. Instead, the ATM masquerades as the native font subsystem and performs the steps required to render the character on the output device using the Type 1 format font or to otherwise satisfy the user program request. In the case of user program requests that require data to be returned from a native font, the ATM converts the appropriate information from the Type 1 format font into a format expected by the user program.

Despite all of the above, pure-outline fonts are problematic for the basic reason that they do not support embedded color information and, as a result, they always render characters with a user-selected color like a rubber stamp.

The third basic prior art font type is referred to as a program font. Program fonts have been embodied in the Adobe™ PostScript™ programming language Type 3 format font. A program font is scalable and consists of a program and embedded data for each character. In operation, when a user program requests text output, an appropriate program in the font is called by the graphics subsystem for each character to be displayed. The program, and its embedded data, are interpreted to cause appropriate markings to be made on an output device to create each character shape. A typical program font describes, and then causes an outline to be filled or stroked. Adobe™ documentation offers the following advice about color in Type 3 format fonts " . . . is useful, for example, in defining characters that incorporate two or more specific opaque colors (e.g. opaque black and opaque white). This is unusual; most characters have no inherent color but are painted with the current color within the character's outline, leaving the area outside unpainted (transparent)."

The fourth basic prior art font type is referred to as a parametric outline font. The parametric outline font is a scalable font that contains typographical shape descriptions (sometimes referred to as parametric font schemes) which, for each character in the alphabet, define shapes and position of lines that enclose filled-in portions of the characters. A typical parametric outline font contains a coded characterization of the font's general look, as well as character-by-character information that describes deviations of each particular character from the font's general look.

Aside from the above-described prior art font technologies, there are other, seemingly-similar technologies, for rendering characters. These seemingly-similar technologies include; for example, clip art, linked objects, paint programs and a few specialized prior art programs. In accordance with clip art technology, many ornate alphabets are presently available as clip art images or drawings. As is well known, to render text using clip art, the user must manually select, paste-in, and position appropriate clip art files, each clip art file representing one letter in a message (the clip art may or may not contain multiple colors). Clip art technology is problematic because it does not permit a user to type desired text which is recognized as such, for example, by a word processor, and it does not provide automatic conversion of text to rendered shapes. Further, clip art is problematic because it is generally not automatically evenly placed on a baseline and spaced by application programs.

In accordance with linked objects technology, a few special programs exist in the market that enable a user to type some text and then to apply color to, and to transform, existing fonts (for example, to make them look three dimensional). It is then possible to link the graphical output of these programs into other programs using a technology such as, for example, Microsoft's OLE. In accordance with this linked objects technology, from the point of view of the user program, for example, Microsoft Word, the text being rendered is not considered to be text. Linked objects technology is problematic because special provisions (other than a graphic subsystem's normal character-rendering API calls) must be made by user programs that want to use linked objects. Further, text to be rendered in color is not stored with the rest of the "ordinary" text data in the user program's memory and files. Indeed, the user program simply views the linked objects as separate windows on the display that are managed by another program, i.e., the user program is unaware of the nature or contents of that window. This is problematic because a word processor cannot "find" a character string which resides in a linked object.

In accordance with generalized computer graphics technology, many generalized paint or draw programs are available in the market that enable an operator to transform or create letter shapes, and add color. However, this paint program technology is problematic because the output of a paint program is essentially a linked object or a custom clip art file.

A first specialized prior art program is entitled Art Importer, also previously entitled KeyMaster. Art Importer creates PostScript™ programming language Type 3 format fonts from user-supplied clip art. The resulting PostScript™ programming language Type 3 format fonts ignore user-selected color and supply their own color obtained from the user-supplied clip art. In addition, the resulting PostScript™ Type 3 format fonts can perform many special effects on, and transformations of, existing fonts. Art Importer was promoted by its manufacturer as enabling users to create fonts that contained symbols like company logos, signatures, and other frequently-used artwork. That is, the character "A" would be rendered as the company's logo. The so-called advantage of having text rendered by a font to produce a logo instead of using conventional clip art to produce the logo was that it would be easier and simpler for a user to scale and position text than clip art. Using the Art Importer font technology, each character is typically rendered in a different shape, using a different color scheme, and having colors applied differently. As a result, the created fonts require separate algorithms for each character. This is problematic since the fonts do not provide characters having a consistent, identifiable look.

A second specialized prior art program is entitled Corel™ Depth. Corel™ Depth is a program (typical of several similar programs on the market) which receives text to be rendered, a system font to be used in rendering the text, and input data from a user program. The Corel™ Depth program contains a library of various styles to apply to the text, for example, the styles include, for example, color information, fade information, extrusion information, and so forth. In use, the Corel™ Depth program applies the user selected style to the input text and font to render the text. As one can readily appreciate, Corel™ Depth is a special purpose application program and not a font, i.e., a programming construct that is used outside of an application program.

In light of the above, there is a need in the art for method and apparatus for rendering characters on an output device using multiple color fonts ("MCFs"). Further, there is a need in the art for MCFs which are scalable fonts (fonts use to render characters in multiple sizes and output device pixel resolutions) that enable the use of one or more types of color scheme (color design) data and character shape data in conjunction with one or more types of embedded transformation data (shapes and visual looks) to render the characters. Still further, there is a need in the prior art for embodiments of such MCFs that can be used: (a) in coordination with present operating systems; (b) as an annex to application programs; (c) in coordination with, or as an integral part of, an operating-environment; and (d) over the Internet or other computer networks.

SUMMARY OF THE INVENTION

An embodiment of the present invention is a multiple media font; one type of such a multiple media font being a multiple color font ("MCF"). In particular, in accordance with the present invention, an MCF is a scalable font (a font used to render characters in multiple sizes and output device pixel resolutions) having one or more types of embedded color scheme data and character shape data that are used in conjunction with one or more types of embedded transformation data to render characters. In other embodiments of the inventive MCF, color scheme data and/or character shape data need not be embedded in the MCF, but may be stored elsewhere or be supplied to the MCF from user programs or from storage in computer networks.

As used in accordance with the present invention, a color scheme is a color design, i.e., a grouping of one or more colors used to render a character or a portion of a character. Here, the word "color" is used in the computer-graphics sense of the word where every shade, intensity and transparency of every hue (including gray) is considered to be a different "color." Transformation data comprises shapes and visual looks used to render a character or a portion of a character, for example, a description of the portions of a character to which designated colors from a color scheme are to be applied. In addition, in accordance with the present invention, the transformation data comprises descriptions for transforming shapes (to produce various graphics looks) as well as for transforming colors (to produce various graphics looks such as, for example, the presence of a source of light shining on the characters).

Lastly, in accordance with the present invention, a multiple media font can be embodied for use: (a) in coordination with present operating systems; (b) as an annex to application programs; (c) in coordination with, or as an integral part of, an operating-environment; and (d) over the Internet or other computer networks.

BRIEF DESCRIPTION OF THE FIGURE

Components which are the same in the various figures have been designated by the same numerals for ease of understanding.

DETAILED DESCRIPTION

Figure 1:
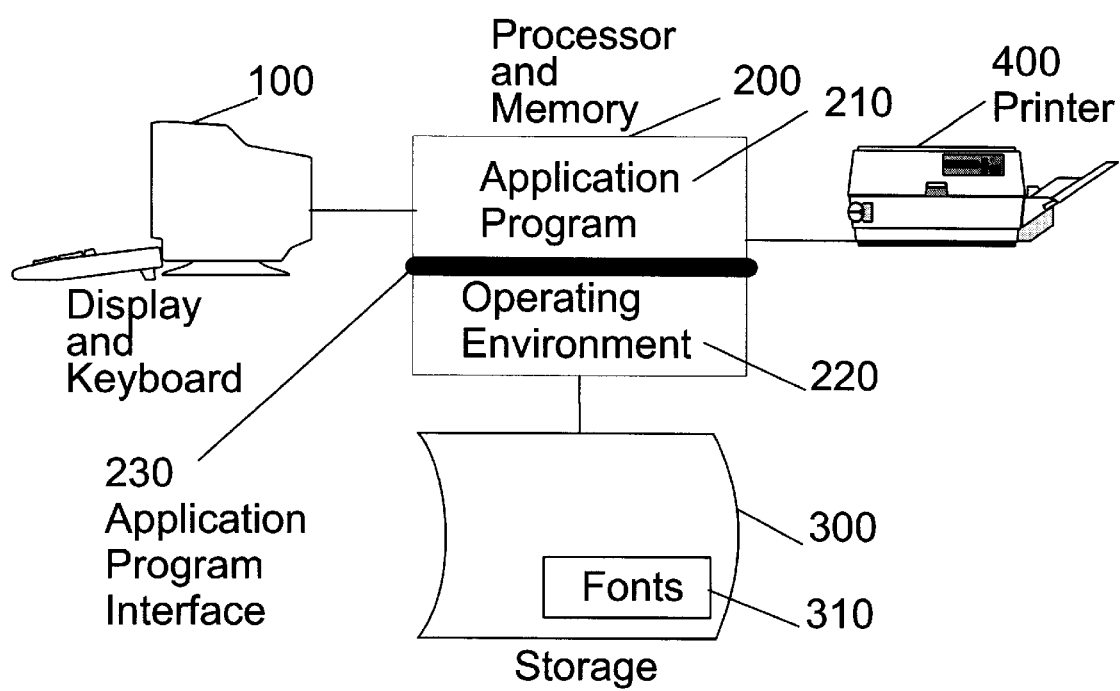
FIG. 1 is a block diagram of a computer system that uses fonts, which computer system includes a display device and keyboard, processor and memory, storage, and a printer.

Digital fonts are data structures that provide mappings between symbolic codes representing characters (letters, numerals, diacritical marks, typographic ornaments, and the like) and media output such as visual shapes, auditory sound, and so forth that humans recognize. For visual media output, scalable fonts render the characters in multiple sizes and output device pixel resolutions.

A first embodiment of a multicolor font (MCF) fabricated in accordance with the present invention is a scalable, digital font having one or more types of embedded color scheme data and character shape data that are used in conjunction with one or more types of embedded transformation data to render characters. In addition, as will be described in detail below, in a second embodiment of an MCF fabricated in accordance with the present invention, color scheme data and/or character shape data need not be embedded in the MCF, but may be stored elsewhere or be supplied to the MCF from user programs or from storage in computer networks. As used in accordance with the present invention, a color scheme is a color design, i.e., a grouping of colors used to render a character or a portion of a character. Here, the word "color" is used in the computer-graphics sense of the word where every shade, intensity and transparency of every hue (including gray) is considered to be a different "color." Transformation data comprises shapes and visual looks used to render a character or a portion of a character, for example, a description of the portions of a character to which designated colors from a color scheme are to be applied. In addition, in accordance with the present invention, the transformation data comprises descriptions for transforming shapes (to produce various graphics looks) as well as for transforming colors (to produce various graphics looks such as, for example, the presence of a source of light shining on a character). Thus, in accordance with the present invention, an MCF is used to render scalable characters comprised of one or more colors and color schemes, such as characters that are commonly seen in advertising, packaging and signage. In further addition, in accordance with the present invention, inventive MCFs are embodied for use: (a) in coordination with present operating systems; (b) as an annex to application programs; (c) in coordination with, or as an integral part of, an operating-environment; and (d) over the Internet or other computer networks.

In its most general aspect, an MCF fabricated in accordance with the present invention is used to transform color scheme data and character shape data to provide multiple color renditions of characters having a consistent "look" in the graphics sense of the word for a particular font (although, as described below, certain embodiments of the present invention provide multiple looks). In some embodiments, color scheme data and/or character shape data are embedded within the MCF and in other embodiments some, or all, of the color scheme data and/or character shape data are input by a user or supplied from storage and/or computer networks and so forth. For illustrative purposes, and for ease of understanding, one can refer to: (a) a method for rendering a character as utilizing the MCF to carry out the following steps and (b) an apparatus for rendering the character as utilizing the MCF according to the following:

$$\text{Character Rendition}=\text{MCF}(\text{character code}, X_{color\ scheme}, X_{character\ shape}) \quad (1)$$

where MCF, as a method, specifies the steps used to transform and apply color scheme data ($X_{color\ scheme}$) and character shape data ($X_{character\ shape}$) to render the character identified by the character code and where MCF, as an apparatus, specifies apparatus for transforming and applying color scheme data ($X_{color\ scheme}$) and character shape data ($X_{character\ shape}$) to render the character identified by the character code. As a further generalization of the present invention, the MCF may itself contain embedded color scheme data and character shape data. In that case, eqn. (1) is modified as follows:

$$\text{Character Rendition}=\text{MCF}_{color,\ shape}(\text{character code}, X_{color\ scheme}, X_{character\ shape}) \quad (2)$$

As a still further generalization of the present invention, the MCF may itself contain mechanisms for identifying relevant information in other MCFs such as for example, character shape information. Thus, in this sense, the MCF may be considered to be recursive.

As will be explained in detail below, the character rendition method and apparatus can receive input information from user programs and/or other sources to enable the rendition method and apparatus to utilize selected ones of data such as color scheme data, character shape data, transformation data, and so forth. Lastly, the rendering of characters on an output device includes rendering characters on printers, computer screens such as, for cathode ray tube and liquid crystal screens, film recorders, computer controlled devices, and so forth.

Finally, in the most general sense, although the present invention will be explained in terms of multiple color fonts, the present invention is not limited to multiple color fonts and relates more generally to as multiple media fonts. This means that characters are rendered using multiple media output apparatus. For example, in one such multiple media embodiment, media output includes music. Thus, although the present invention is described below for ease of understanding in terms of color scheme data, more generally, it is considered to include multiple media data such as color and music. For such a multiple media font, the output device includes a multiplicity of output devices, for example, an output device for visual display which includes output devices for providing an appearance of motion such as animation (output devices such as, for example, printers, computer screens, and output devices for providing an appearance of motion such as, for example, movies, video tapes, laser discs, computer screens, and so forth) and an output device for auditory display (output devices such as speakers, ear phones, and so forth). This can provide interesting output effects made of a combination of visual looks and auditory sounds. In addition, the multiple media font can also include olfactory output such as, for example, fragrances. In further addition, the multiple media font can also include tactile output such as, for example textures or shapes for output devices capable of providing output in more than two dimensions. Such output devices include, for example, laser actuated modeling apparatus available for providing molds for industrial use.

The following describes how a first embodiment of MCFs that are implemented as PostScript™ programming language Type 3 format fonts are utilized in a presently existing Microsoft™ Windows™ ("Windows") environment. As is well known in the art, a PostScript™ programming language Type 3 format font is a program written in the PostScript™ programming language (see a book by Adobe Systems Incorporated entitled "PostScript Language Reference Manual"—Second Edition, Addison-Wesley, 1990. ISBN 0-201-18127-4 for a description of the PostScript™ programming language). However, as will be described in detail below, the present invention is not limited to MCFs that implemented as PostScript™ programming language Type 3 format fonts. Further, although this embodiment is described in a Windows environment for ease of understanding the present invention, the present invention is not limited to this environment and this embodiment can readily be generalized in accordance with methods well known in the art for use with any computer graphics environment.

MCFs are accessed by a user in a presently existing Windows environment as follows. In accordance with the present invention, the user selects a font from a menu in the user (or application) program (for example, using a pull-down menu) and types characters. The font selected from the menu in the user (or application) program is not an MCF because the presently existing Windows environment does not support MCFs. However, in accordance with this embodiment, the user selects a one-color TrueType™ font (Windows' native font). This font is a mockup (stand-in) font that has been designed, or chosen, to approximate the appearance rendered by the MCF. In particular, in one variation of this embodiment, the mockup font renders characters with exactly the same inter-letter spacing as the MCF.

In accordance with this embodiment, the name of the mockup font is different from the name of the MCF. For example, in this embodiment, the mockup font has a few extra characters at the end of the name of the MCF. Thus, for an MCF named "HotMetal," the mockup font referenced in the user's document is a bona fide Windows TrueType™ named "HotMetalMF." As a result, whenever the user prints the document to an ordinary printer using the mockup font, the document is printed using the mockup font, i.e., until a print request for a user's document reaches the PostScript-printing stage, the mockup font is processed by Windows in exactly the same manner as all its one-color fonts are processed. For example, in this embodiment, characters displayed on the user's display terminal are not rendered in multiple colors, but are rendered in the one-color mockup of the appearance produced by the MCF on a PostScript™ programming language output device.

In this embodiment, since MCFs are implemented as PostScript™ programming language Type 3 format fonts, the document must be printed to a PostScript™ programming language printer or to a software PostScript™ programming language emulator (software that renders PostScript™ programming language fonts on a computer screen display or on a PostScript™ programming language printer) in order to use the MCFs to print in multiple colors. The exact colors and color schemes of the printed characters will depend on color and color scheme data contained (embedded) in the MCF. Further, in accordance with this embodiment, the software PostScript™ programming language emulator may also provide an on-screen preview feature. This embodiment may also be used to create a computer file containing PostScript™ programming language statements that may be stored or transmitted and optionally rendered at a later time.

As is well known, the part of Windows software that converts a user program's generic, print-related, API formatted calls into printer-model-specific commands is called a "driver." Since many printers, including PostScript™ programming language printers, have built-in fonts and font engines, Windows attempts to save time by using these presumably high-speed, built-in, font engines. In accordance with this embodiment, prior to printing, it is necessary to change each request for the mockup font into a request for its associated MCF. Specifically, in the example described above, it is necessary to change a request for "HotMetalMF" to a request for "HotMetal." In accordance with this embodiment, this change is assured by editing the computer's Windows control file known as "WIN.INI." WIN.INI contains a section called "[PSCRIPT]" to which one adds a line for each different mockup font vs. MCF name. For the example given above, the following is added to the [PSCRIPT] section:

[PSCRIPT]
HotMetalMF=HotMetal
MoreMetalMF=MoreMetal
. . . etc. . . .

In accordance with the present invention, the [PSCRIPT] section shown above will cause Windows to substitute the name of the MCF for its associated mockup font whenever the user prints to a PostScript™ programming language printer or to a software PostScript™ programming language emulator.

Further in accordance with this embodiment, another section within the "WIN.INI" file must be edited to ensure that Windows loads all the necessary MCFs from storage, for example, the computer's disk, into the memory of the PostScript™ programming language printer or into the memory of the software PostScript™ programming language emulator before attempting to use them. The name of the section is "[PostScript," followed by the name of the port to which the printer or emulator is attached, followed by a "];" for example "[POSTSCRIPT,LPT1.DOS]). For each MCF, this is accomplished by adding a line in the section that identifies the file containing the MCF to Windows. Finally, it is necessary to add a line to that section that states how many font file descriptors are in the section. Again, for the example given above, in this embodiment, the following is added to the section:

[POSTSCRIPT,LPT1.DOS]
Softfonts=2
Softfont1=C:\COLORFNT\HOTMETAL.PFM, C:\COLORFNT\HOTMETAL.PFB
Softfont2=C:\COLORFNT\MORMETAL.PFM, C:\COLORFNT\MORMETAL.PFB
. . . etc. . . .

The net effect of the above-described additions to the WIN.INI file is that all references to mockup fonts are converted to references to associated MCFs whenever a print request is made to a PostScript™ programming language output device. Advantageously, the above-described substitution process is transparent to all application programs, and it works within the regular Windows font framework. Further, all of the above-described changes to the WIN.INI file can be made by a user, or they can be made by an INSTALL program that is shipped with the MCFs.

As is well known, a PostScript™ programming language Type 3 format font is automatically executed each time a PostScript™ programming language interpreter needs to convert a coded character symbol into its visual representation, for example, to print a character. As is further well known, the PostScript™ programming language interpreter is a part of a PostScript™ programming language printer or software PostScript™ programming language emulator that executes the font's PostScript™ programming language instructions to render the character in raster dots. As is still further well known, several MCFs can be loaded into a PostScript™ programming language interpreter at the same time, but only one is active at any given time. The selection of which MCF is to be the active MCF is governed by PostScript™ programming language instructions sent to the PostScript™ programming language interpreter from the host computer. Similarly, PostScript™ programming language instructions sent to the PostScript™ programming language interpreter from the host computer control the PostScript™ programming language interpreter's currently-active MCF size, position and default text color.

Whenever the PostScript™ programming language interpreter needs to print a character, it executes the currently active MCF as a subroutine (a font subroutine). In particular, in order to print a character, the PostScript™ programming language interpreter passes the character's code to the font subroutine as a program argument. The font subroutine can also access the currently-active font size, position, default text color and so forth using appropriate PostScript™ programming language instructions. At this point, it is entirely the MCF's responsibility to do whatever is necessary to render the character appropriately, i.e., to generate the appropriate raster of dots using the given information.

One embodiment of an MCF fabricated in accordance with the present invention is comprised of three (3) basic logical components "(MCFBLCs"). MCFBLC 1 comprises a representation of character shape data, for example, in the form of colorless, outline equations that delineate character shapes. MCFBLC 2 comprises color scheme data, and/or image data (for example, digital photos) that can be applied to various parts of characters, and/or drawing data that can be applied to various parts of characters. MCFBLC 3 comprises transformation data such as, for example, descriptions of algorithms that apply color (or color algorithmically derived from color data) in accordance with color scheme data to: (a) areas described by character shape data or (b) areas algorithmically derived from character shape data. In particular, MCFBLC 1 could be character shapes from a one-color Times Roman font; MCFBLC 2 could specify various user-selectable colors and color schemes, for example, such as {X=Black, Y=Red}, {X=Green, Y=Yellow} and so forth; and MCFBLC 3 could specify transformation data such as, for example, the character outline must be stroked with a line 6 units wide in color X, then stroked again with a line 2 units wide in color Y. The result of rendering characters using such an MCF would be characters shaped like Times Roman characters, but rendered as a wire frame line that is striped black, red, black, or green, yellow, green, depending on the color scheme selected. In further embodiments, MCFBLC 1 and MCFBLC 2 could be supplied by a user, for example, in an interactive mode.

In accordance with structured software-engineering practice, in a preferred embodiment of the present invention, the three (3) MCFBLCs described above are embodied as three (3) separate sections in a PostScript™ programming language Type 3 format font. Although an embodiment comprised of three (3) separate sections is the preferred embodiment, it is not the only method for implementing the PostScript™ programming language Type 3 format fonts. For example, one can merge one or more of the MCFBLC into one section, or subdivide the MCFBLCs into different combinations or permutations.

In accordance with the preferred embodiment, in order to easily produce a large number of different MCFs, a boilerplate-program approach is used. In accordance with the boilerplate-program approach, all commonly-recurring font logic is consolidated into a single piece of code that is copied into each MCF, along with font-specific elements. Although the present invention is not limited to this approach and this approach is often less efficient than logic written specifically for each MCF, this approach is desirable in that it is a great time saver for development. It should be clear to those of ordinary skill in the art that one can also split the boilerplate code into multiple sections and copy only the necessary sections into a particular MCF.

The following defines several PostScript™ programming language variables that control the appearance of characters rendered by a particular MCF. The variable names are known to the boilerplate section which uses the contents of these variables to control the output. As is set forth below, each variable can potentially contain several types of information. The boilerplate section recognizes the different possible variations by examining their PostScript™ programming language data type (for example, array, number, subroutine, etc.) and then acts on them accordingly. The variables are /basefonts, /palette, /imagearray, /drawingarray, and /parameters.

The variable /basefonts comprises basic character shapes for the font (note that /basefonts corresponds to MCFBLC 1). /basefonts is comprised of one-color fonts or their names or an array of PostScript™ programming language subroutines that draw or define character outlines in accordance with methods well known in the art or the identifier of MCFs containing the desired character data. /basefonts may also contain information which allows the MCF to select a suitable one-color font from the repertoire of those available in the operating system. For the case where /basefonts is comprised of a one-color font or its name, the PostScript™ programming language automatically extracts the shapes comprising the character from that one-color font (character outline data). In another embodiment, /basefonts comprises an access key, for example, a number or a name which is used to access, for example, an indexed array of one-color fonts; each one-color font being referred to by its number or name.

The variable /palette comprises color schemes (note that /palette corresponds to MCFBLC 2). In one embodiment, each color scheme is implemented as an indexable table (array) of color values which can be accessed by numbers from 0 through the number of colors minus one. In such an embodiment, other parts of the MCF can refer to a given color by its number. Such an embodiment is advantageous in that it logically de-couples the actual colors from the algorithms that apply them to various parts of the character or portions of the character. In addition, /palette can comprise multiple color schemes in an array, however, only one color scheme can be active at any given time. The active color scheme can be set in different ways in a manner to be described in detail below. In accordance with the one embodiment, the rest of the MCF refers to colors by number and, hence, different color schemes can be used with the same algorithms to render characters in different colors.

The variables /imagearray and /drawingarray comprise pictures or drawings that are used by the boilerplate section: (a) to fill in all or portions of characters or (b) to be disposed in and/or around all or portions of characters (note that /imagearray and drawingarray also correspond to MCFBLC 2). Such pictures or drawings are generally rectangular in shape and do not have to assume the shape of the characters being filled the pictures or drawings will be "clipped" in accordance with methods well known in the art to fill only the desired areas of the fonts. /imagearray contains a binary image that is coded in a standard manner in accordance with the PostScript™ programming language. /drawingarray contains PostScript™ programming language instructions that generate a particular image; the drawing can have colors embedded in it, or it can symbolically refer to colors in /palette. Again, these variables can comprise multiple pictures or drawings in arrays. The active image or picture can be selected in the same manner as that used to select the active color scheme above (to be described in detail below).

Lastly, the variable /parameters specifies transformation data (for example, algorithms) that tie together the variables basefonts, /palette, /imagearray, and /drawingarray to produce colored output (note that /parameters corresponds to MCFBLC 3). The variable /parameters comprises an array of coded information (transformation data) that will be interpreted by the boilerplate section to invoke PostScript™ programming language instructions and/or subroutines in the boilerplate with specific arguments (i.e., /parameters is a programming language that sets forth: (a) the names of sections of PostScript™ programming language instructions in the boilerplate section and/or (b) coded subroutine names and subroutine arguments to be fed to subroutines in the boilerplate section). As an example, and for use in understanding this embodiment, assume the following. Assume that /basefonts contains only TimesRoman in its $0^{th}$ element (i.e., Times Roman is the basic character shape), assume that /palette contains black in its $0^{th}$ element and red in its $1^{st}$ element. In this example, to render a character having a basic TimesRoman shape with a wire frame line that is striped black, red, black, one would code /parameters in accordance with the following pseudo-code:

{select one-color font 0}

{stroke the outline of the current one-color font with a line 6 units wide in color 0}

{stroke the outline of the current one-color font with a line 2 units wide in color 1}

The following is a description of an embodiment of the boilerplate section. The boilerplate section initializes the MCF according to well-known PostScript™ programming language conventions. Then, having been initialized, the PostScript™ programming language interpreter causes the MCF to render a given character by calling a PostScript™ programming language-mandated /BuildChar procedure with a program argument comprised of the code of the character to render. In accordance with this embodiment, characters are broken into two types: (a) characters that are rendered and (b) control characters that enable a user to control the MCF. As those of ordinary skill in the art will readily appreciate, a user will want to select background color and color schemes used by an MCF to render characters. As such, in accordance with this embodiment, predetermined, non-printing control characters are used to enable a user to utilize existing, non-MCF-aware application programs and non-MCF-aware APIs to control the background color and color schemes used by the MCF. Knowing the control characters, and the results they produce for the MCF in question, the user types one or more control characters in front of each word or phrase the user wants to control. These control characters cause changes inside the MCF (or MCF engine, as will be described in detail below) that cause a desired background color and/or color scheme to be used until fuirther change.

In accordance with this embodiment, the control characters break down into two independent groups: (a) those that set the background color and (b) those that set the current color scheme. The designer of a particular MCF will typically choose to activate only one control character—or set of control characters—within each group, depending upon which is most user-friendly; given the artistic and technical characteristics of that font.

In the case of a "set-background-color-to-current" control character, a background color variable containing the background color is set to the currently-active PostScript™ programming language default color in effect when the control character is processed. The background color variable is available to subsequent invocations of the /BuildChar procedure.

In the case of "set-background-to-given-color" control characters, there are a set (usually a consecutive range) of character codes which each perform the same function but with different colors. Each different control character sets the background color variable to a predetermined color value.

The set-background-color-to-current and the set-background-to-given-color control characters are exclusive in that one or the other is used at one time.

In the case of a "set-color-scheme-to-current" control character, the currently-active PostScript™ programming language default color is mapped to a color scheme access key, for example, number, according to a predetermined mapping. For instance, all shades of red could be mapped to color scheme 0, all shades of green mapped to color scheme 1, and so forth. The color scheme number is stored in a variable that selects the color scheme within the /palette array that will be active during subsequent invocations of the /BuildChar procedure.

In the case of "set-color-scheme-to-given" control characters, there are a set (usually a consecutive range) of character codes which each perform the same function but with different color schemes. Each different control character sets an active color scheme variable to a predetermined color scheme number. In accordance with the present invention, it is possible to have two or more groups of control characters which each separately control the colors of different graphic elements, or groups thereof, within an MCF.

The set-color-scheme-to-current and the set-color-scheme-to-given control characters are exclusive in that one or the other is used at one time.

The /BuildChar procedure determines whether the character code is within the range of codes representing printable characters or control characters. In accordance with this embodiment of the present invention, there are four possible types of control characters. In each case, the /BuildChar procedure will cause some changes in the variables contained inside the MCF based on the value of the character code, but it will not cause the MCF to display the control character directly.

Figure 2:
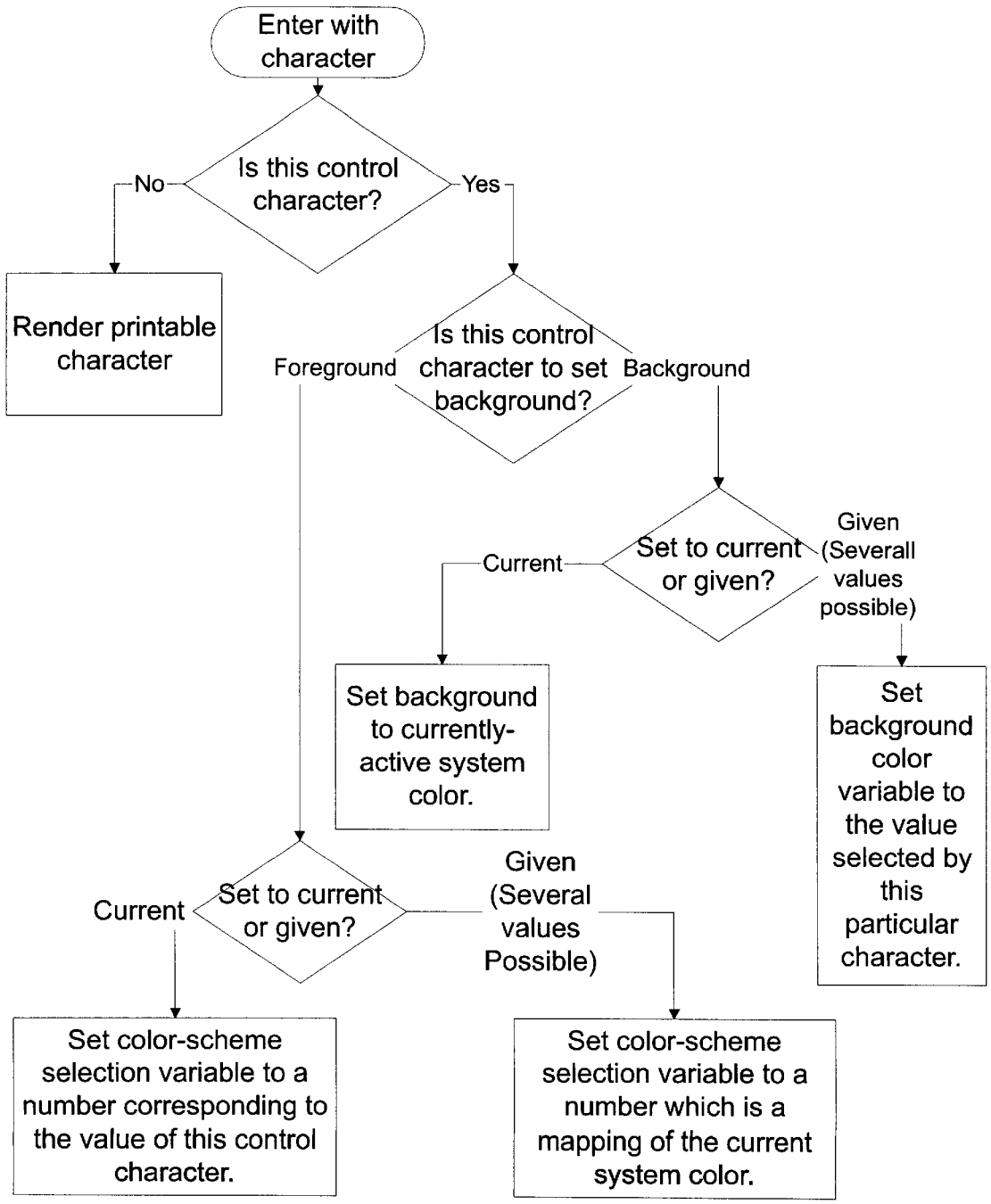
FIG. 2 is a flow chart showing how characters are used to select background colors and color schemes in accordance with the present invention.

FIG. 2 shows a flowchart of how /BuildChar handles characters. If the character code represents a displayable character, the /BuildChar procedure must do what is necessary to display the character. It starts by retrieving the contents of the /parameters array in the font-specific section of the MCF. Proceeding from the first to the last element of the array, each array element is decoded into: (a) the name of an action subroutine or (b) a program argument for an action subroutine; which action subroutine is contained within the boilerplate section. The boilerplate section passes the arguments and the character code to the action subroutine and the action subroutine is executed.

The action subroutines in the boilerplate section that may be designated by /parameters, their program arguments, and the coding scheme used can all be readily developed by those of ordinary skill in the art. Further, the action subroutines that can be designed span the entire range of computer-graphics techniques, and will depend on the particular artistic looks that an MCF needs to achieve; see, for example, a book by J. Foley, et al. entitled "Computer Graphics: Principles and Practice"—$2^{nd}$ Edition, Addison-Wesley, 1990. ISBN 0-201-12110-7.

Appendix A shows an inventive MCF embodied in a PostScript™ programming language Type format. The MCF of Appendix A renders characters in an art-deco-like face that fades from mint green at the bottom to clear at the top and which has a black outline around the edges and a black, drop shadow slightly to the right and behind the character.

Figure 7:
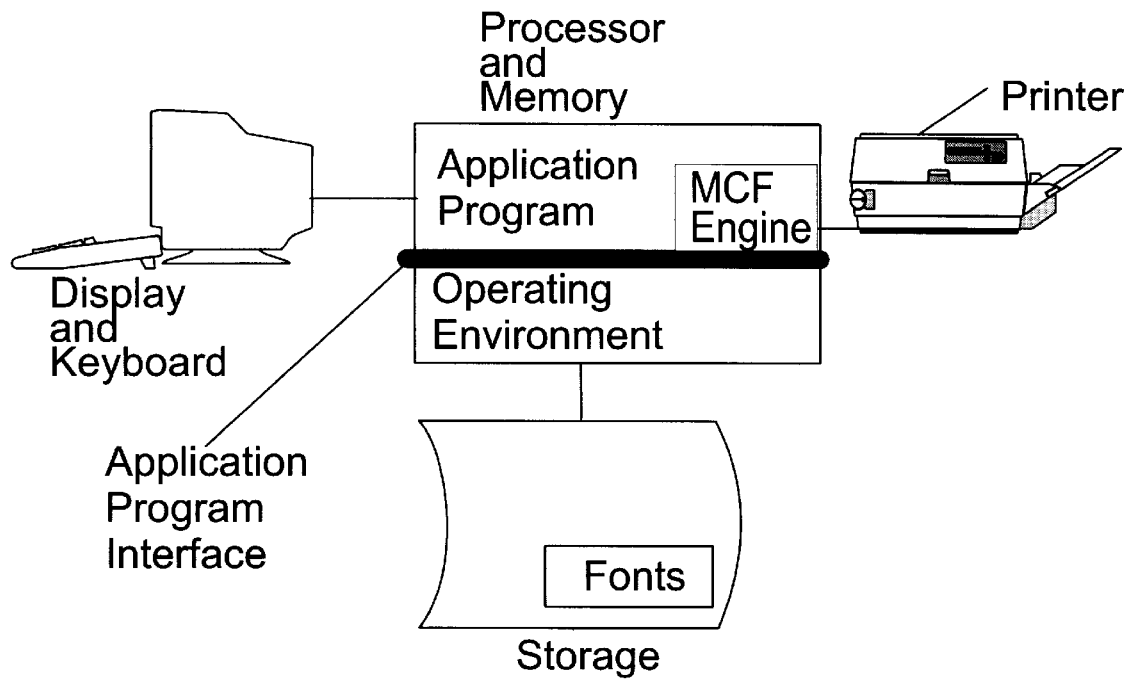
FIG. 7 is a block diagram of a computer system that utilizes MCFs in accordance with the present invention wherein an MCF engine is embodied as an extension to an operating-environment.
Figure 8:
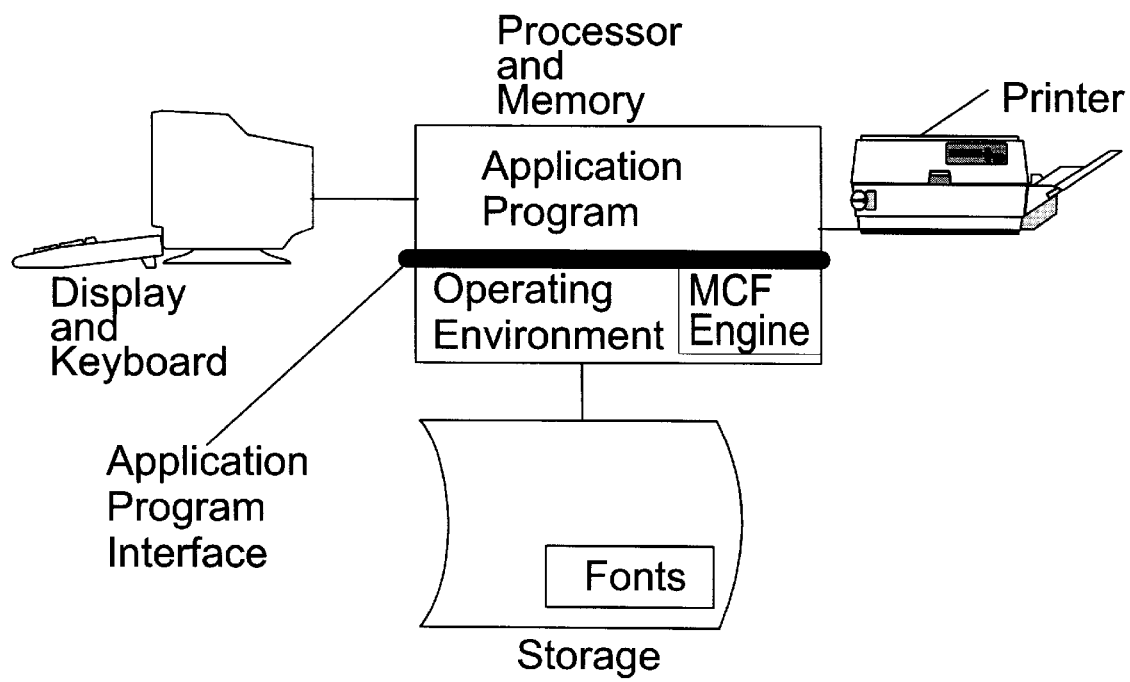
FIG. 8 is a block diagram of a computer system that utilizes MCFs in accordance with the present invention wherein an MCF engine is built into the operating-environment.

The PostScript™ programming language Type 3 format font embodiment of MCFs described above achieves the goal of adding MCF support to a computer system, but it consumes considerable computer memory and processing resources. In particular, in this embodiment, the user must switch to a special on-screen-preview program or print out a document to see exactly how characters rendered by the MCFs will appear. Also, the PostScript™ programming language Type 3 format font embodiment is not practical in a network browser environment. An inventive solution to the limitations of the PostScript™ programming language Type 3 format font embodiment is to integrate the MCF-processing functions closely with a computer-graphics environment or with an operating system. This goal is achieved by building a custom MCF engine into the computer-graphics environment or the operating system. The same goal can also be achieved by building an equivalent MCF engine into a computer-graphics-environment or an operating-system extension. Since both approaches are almost identical, the following discussion applies to both, except where noted. In particular, the term "operating-environment" is used to signify either implementation. FIGS. 7 and 8 show a computer system, a display device, an operating-environment, storage, fonts and a printer wherein: (a) an MCF engine is used as an extension to the operating-environment (FIG. 7) and (b) an MCF engine is built into the operating-environment (FIG. 8).

An operating-environment extension is a set of program routines—typically loaded at system startup time—that enhance the functionality of the operating-environment. In the case of an MCF operating-environment extension, it adds MCF functionality to an existing font mechanism by extending the operating-environment's existing application program interfaces (APIs) and logic to support MCFs, and by creating new APIs for controlling MCF-specific functions. The MCF operating-environment extension is designed to behave as if it were, from an application program perspective, built into the operating-environment.

A given operating-environment may or may not provide explicit facilities for adding font-engine extensions. For example, it is expected that a future version of Windows, for example, NT Version 4.0 will provide special "sockets" that will accept "plug-in" font engines. In cases where no such facilities exist, the MCF must "hook" existing API formatted calls to piggyback its functionality onto said APIs in the manner described below.

An implementation of an operating-environment extension is given in a software package by Adobe Systems Incorporated entitled "Adobe Type Manager," Mountain View Calif., 1991 and detailed in a book by A. Schulman, et al. entitled "Undocumented Windows," Addison-Wesley, 1992. ISBN 0-201-60834-0 (see in particular pp. 43–45 and 602). In accordance with the present invention, the MCF extension intercepts font-related requests from user (application) programs and monitors them for MCF-related requests. This is referred to in the art as "hooking" and enables the MCF extension to pretend to be part of the operating-environment. In such a case, the MCF extension does not forward MCF-related requests to the operating-environment. Rather, the MCF extension itself does whatever is necessary to process the application program's request, as if the MCF extension were actually part of the operating-environment.

The following is an overview of the above-described hooking process. A user selects an MCF from a menu in an application program and types some characters. If the application program has not been designed to handle MCFs differently from existing one-color fonts, it makes the same API formatted call to the operating-environment it would have made for one-color fonts. Indeed, the application program may have been created before MCFs were invented, but it would nonetheless work unmodified for color with MCFs using the old API formatted calls. For representative APIs, see a book by Microsoft Corporation entitled "Microsoft Windows Programmer's Reference"—Volume 2, Microsoft Press, 1992. ISBN 1-55615-463-1. Assuming a color display screen, the characters that the computer displays on the screen of the computer or terminal are shown in multiple colors in the same way they will appear when printed to a color printer because the exact colors and design of the printed characters depend on information contained in the MCF.

A major difference between the MCF engine implementation described here (this includes an MCF engine built into the computer-graphics-environment as well as an MCF engine built into an operating-system extension) and the PostScript™ programming language Type 3 format font implementation described above is that the logic roughly corresponding to the PostScript™ programming language Type 3 format font boilerplate section is moved into the MCF engine. This is done because: (a) it is desirable to provide MCFs that occupy less memory, (b) putting compiled machine instructions into the MCF would prevent them from working on many other computer platforms and could pose a security risk, and (c) it would be redundant to build a full-blown general-purpose language interpreter into the MCF engine. A further major difference between the MCF engine implementation and the PostScript™ programming language Type 3 format font implementation is that the MCF engine has two-way communication with application programs whereas the PostScript™ programming language Type 3 format fonts only have one-way communication with application programs, i.e., they merely render characters to an output device according to commands. Indeed, the variety of operations that an application program can request of the operating-environment (and thus the MCF engine) is much richer than the operations that the operating-environment can request of PostScript™ programming language Type 3 format fonts. This is because the operating-environment acts as a translation layer which converts sophisticated API formatted calls into several less-sophisticated PostScript™ programming language operations. Thus, the MCF engine must directly support the more sophisticated operating-environment API formatted calls.

To understand how an MCF engine is integrated into an operating-environment, it is important to note that most typical operating-environments create a graphics context for each graphic region (display window, sub-window, printed page and portions of pages) in the system. For example, graphic contexts in Windows are known as "Device Contexts" (see a book by Microsoft Corporation entitled "Microsoft Windows Programmer's Reference—Volume I," Microsoft Press, 1992, ISBN 1-55615-453-4; see also a book by A. Schulman, et al. entitled "Undocumented Windows," Addison-Wesley, 1992. ISBN 0-201-60834-0). Each graphics context is comprised of a collection of variables that contain information about the current font, color, position on the display surface, and so forth. The contents of these variables control many aspects of the appearance of subsequent output in its respective graphic region. Graphics contexts also contain information about the physical output device to which they are logically connected. Every graphics context in a system is given a unique number known as a "handle." The state (contents) of each graphics context is controlled individually by API calls such as MoveTo, SetCursorPos and SetTextAlign. Such calls change the contents of one or more variables in the graphics context until a subsequent API formatted call changes it.

Once an application program requests an MCF operation via an API formatted call, it is the MCF engine's entire responsibility to carry it out. As explained above, calls to the MCF using MCF formatted API calls require a handle to the desired graphics context. In accordance with the present invention, an MCF-enabled graphics context is a graphics context that is extended to contain information relating to the state of MCF processing, such as the currently-selected MCF, color scheme and/or manually-selected colors, the previous character's position, and other relevant information. Such MCF-related extensions to a graphics context can be added to a data structure associated with an existing graphics context, or it can be kept in a separate, parallel data structure; all in accordance with methods well known in the art. Most of the new MCF API formatted calls merely change the state of the extended graphics context (for example, select a new color scheme), or retrieve information computed from: (a) the extended graphics context (for example, retrieve the current color scheme) or (b) the MCF currently selected into the extended graphics context (for example, list available color schemes in font). Implementation of these API formatted calls and MCF-related extensions is performed in accordance with methods well known in the art.

Whenever an API permitted function requiring a character to be rendered is called by the application program, its appearance is controlled by the current state of the variables in the graphics context, the contents of the currently-selected MCF, as well as by the program arguments to the API formatted call (calls to subroutines designated by the API).

Figure 9:
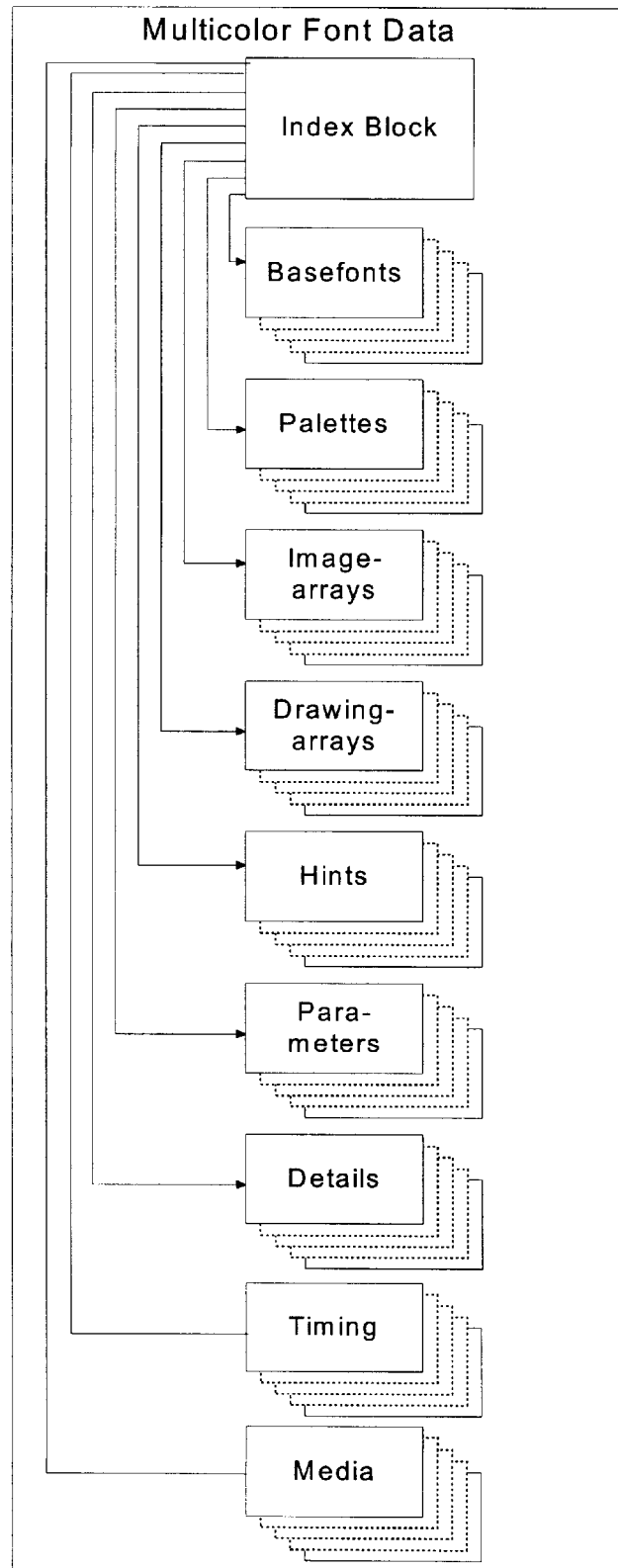
FIG. 9 is a block diagram of a data structure embodiment of an inventive MCF.

The following provides a detailed description of MCFs for this embodiment. In accordance with this embodiment, MCFs are collections of coded data-typically stored in files or other software-defined containers—which describe the appearance of displayed characters and/or the necessary steps to achieve a desired result. The data in an MCF is divided into several optional sections for convenience, much like the font-specific sections of the PostScript™ programming language Type 3 format font implementation described above. Each section can be located in the MCF via a suitable indexing mechanism implemented using well-known techniques. As shown in FIG. 9, the sections are basefonts, palettes, imagearrays, drawingarrays, hints, parameters, details, timing, and media. Note that the preferred embodiment of this invention divides the MCF in the above-mentioned manner, but many other suitable divisions can be implemented. Indeed, the MCF does not necessarily have to divide the information at all—all the information could be jumbled together in one unit.

The section denoted as basefonts comprises data pertaining to the basic shapes that describe the elements comprising the MCF. Each entry in basefonts comprises either a one-color font (or an identifier of a data source of the one-color font such as, for example, its name, the name of a file, the name of a program, a network address, and/or an MCF containing the desired information), a list or table of path definitions that describe each possible element's outline, or any other data that can be used to describe each possible element's outline. The entries in basefonts may be accessible, for example, by character code or as a function of character code. For example, one embodiment of an MCF may force certain characters to be rendered as capitals. Each entry in basefonts may also contain a human-readable description of the entry's function in the MCF, such as, for example, "Snowflake decorations which overlay main shape." In the case of an entry being defined as a one-color font, the entry in basefonts may actually be comprised of the one-color font's name or a list of identifiers of the source of acceptable one-color font substitutes, i.e., a list of one-color fonts or identifiers of a source thereof, any one or which may be used to render the character. For example, a source may be an MCF comprising the one-color font or a list of MCFs comprising acceptable information. The one-color font may also, or additionally, be indicated by specifying a list of values which describe the approximate visual characteristics of acceptable one-color fonts. In this case, the MCF must match the specification with a one-color font available to the MCF engine. One such matching system is the Panose system that is described in a paper by M. S. De Laurentis entitled "Panose 2.0 White Paper" ElseWare Corporation, Seattle, 1993, ElseWare Document Number EWC-92-0015h. In the case of an entry in basefonts being defined as a one-color font, the MCF engine can automatically extract the shapes comprising a given character from that one-color font. This section may be embodied as an indexed array of entries where, for example, each entry is referred to by its number. This section may be empty or omitted. In such a case, the MCF engine must first temporarily insert or otherwise access a character shape definition (typically provided via the MCF engine's API or via applet parameters, see below) prior to using the MCF to render characters. One method of encoding the basefonts section data in the MCFs using a typical one-color font is found, for example, in a book by Adobe Systems Incorporated entitled "Adobe Type 1 Font Format," Addison-Wesley, 1990. ISBN 0-201-57044-0 or a book by Apple Computer Incorporated entitled "The TrueType™ Font Format Specification—Version 1.0," Cupertino Calif., Apple Professional Developer's Association part number M0825LL/A.

The section denoted as palettes comprises color schemes. Each color scheme may be implemented as an indexed table or list of color values, names, indices, files, algorithms or other identifiers that can, for example, be referred to by numbers from 0 through the number of colors minus one. In this embodiment, other parts of the MCF can refer to a given color by its number. The color values can specify colors in an appropriate color space; they can also include the transparency (alpha) value of the color with respect to its background. The advantage of utilizing an indexed color scheme is that it logically decouples the actual colors from the algorithms that apply them to various parts of the MCF. This variable can also contain a list or table of multiple color schemes or an array of identifiers of data sources of color schemes such as, for example, an array of identifiers of MCFs containing the desired color schemes. However, only one color scheme can be active at any given time; the active color scheme being controlled, for example, by a variable in the graphics context. In an embodiment where the rest of the MCF refers to color by number, name or other identifier, different active color schemes can cause the same algorithms to render the character in different colors. The entries in palettes are accessible, for example, by color scheme identifier and may also be accessible by character code and/or by a function of character code. For example, in one embodiment, every $n^{th}$ character in the alphabet has the same color scheme to provide a rainbow output look. This section may be empty or omitted. In such a case, the MCF engine must first temporarily insert or otherwise access a color scheme (typically provided via the MCF engine's API or via applet parameters) prior to using the MCF to render characters. Additionally, each component of a color scheme, and/or an entire color scheme, may also contain a human-readable description of the component or color scheme, such as, for example, "Tropical color scheme" for a color scheme or "Outline around main letter" for a component.

The sections denoted as imagearrays and drawingarrays comprise pictures or drawings, respectively, that are used: (a) to fill in all or portions of characters or (b) to be disposed in and/or around all or portions of characters. Such pictures or drawings are typically (but not are not required to be) rectangular in shape and do not have to assume the shape of the characters being filled—the pictures or drawings will be "clipped" using clipping mechanisms well known in the art (including clipping mechanisms using transparency) to fill only the desired areas of the characters imagearray comprises an array of pixmap images or an array of identifiers of data sources of the pixmap images such as, for example, an indexed table of arrays, an array of files containing pixmaps, an array of identifiers of MCFs containing the desired pixmaps, and so forth. The pixmaps can have color embedded therein or they can symbolically refer to colors in color schemes in palettes. In accordance with the present invention, the pixmap itself may include transparency. Thus, in one embodiment of the present invention, each element in the pixmap includes, for example, eight (8) bits for each of three colors and eight (8) bits for transparency. Likewise, drawingarrays comprises an array of descriptions that can be used to generate a particular image or an array of identifiers of data sources of the descriptions such as, for example, an indexed table of descriptions, an array of files containing descriptions, an array of identifiers of MCFs containing the desired descriptions, and so forth. The drawingarrays can have color embedded therein or they can symbolically refer to colors color schemes in palettes. Each entry in imagearrays and drawingarrays may also contain a human-readable description of the entry's function in the MCF. The entries in imagearrays and drawingarrays may be accessible, for example, by character code or as a function of character code. These sections may be empty or omitted. In such a case, the MCF engine must first temporarily insert or otherwise access a pixmap and/or drawing description (typically provided via the MCF engine's API or via applet parameters, see below) prior to using the MCF to render characters.

The section denoted as hints comprises global constraints on the shape and color of rendered characters or their features. An entry in the section hints is used, for example, as information to compensate for rounding-off errors that may occur when fitting mathematically-defined features onto a pixel grid. For example, one may wish to force all vertical letter stems to have the same final width, despite differences in placement on the pixel grid; see a book by Adobe Systems Incorporated entitled "Adobe Type 1 Font Format," Addison-Wesley, 1990. ISBN 0-201-57044-0. In addition, hints may provide color adjustments such as, for example, fine adjustments in color for different device technologies to ensure the desired look is produced (for example, color may need to be adjusted to provide the same look for a rendering on a screen as opposed to a rendering on a printer). Further in addition, color adjustment may be made which depends on the size of the output, for example, to provide the same perception of color for a smaller sized rendering, it may be advantageous to enhance the intensity of the color. Still further in addition, hints may provide a list of alternative colors for use in particular renderings. The entries in hints may be are accessible, for example, by character code or as a function of character code. This section may be omitted from an MCF if it is unused.

The section denoted as details comprises a list or table or array of identifiers of sources of data; which information may be referred to by all of the sections of the MCF. Each entry in the details section may also contain a human-readable description of the information contained therein, such as, for example, "this entry in details refers to the width of the outline around the main character." The details section is used, for example, by the parameters section (defined below) to obtain specific data for use in rendering characters; the data in a particular entry in the details section being referred to by its index, name, or other identifier. The use of the details section enables a user to temporarily modify selected visual aspects of the MCF via an API formatted call by modifying the value of one or more entries in the details section. The entries in details may be accessible, for example, by character code or as a function of character code. This section may be empty or omitted. In such a case, the MCF engine may first temporarily insert or otherwise access the details section (typically provided via the MCF engine's API or via applet parameters) prior to using the MCF to render characters. For example, a parameter can stroke a path with a line that is "value of the third entry in details" units wide, instead of "2" units wide.

The section denoted as parameters comprises the algorithms that tie together the basefonts, palettes, imagearrays, drawingarrays, hints, details, timing, and media sections to produce multiple media output. The entries in parameters may be accessible, for example, by character code or as a function of character code. Entries in parameters are arrays of coded instructions that will be interpreted by the MCF engine to invoke the various internal functions of the MCF engine designated by the coded instructions. An instruction's operands are also coded along with the instruction. Each entry in parameters may also contain a human-readable description of the function of the entry in the MCF. Entries in the parameters section reference information contained in the other sections and entries in the parameters section may also contain specifications of algorithmic transformations of one or more elements in the MCF. For example, an entry could specify that "a green contour line 2 units wide must be drawn 5 units outside of the actual character shape contained in the font." The colors used may also be algorithmically computed derivatives of the colors in a color scheme. This distinction is important because the list of algorithmic transformations contained in the parameters section should be thought of as a description of how the final output looks, rather than a sequence of operations needed to achieve a certain look. In other words, the parameters section allows the font to include procedural and/or declarative descriptions of fonts.

As one can readily appreciate from the above, when the parameters section contains a single array of instructions all the characters rendered by the MCF will have a consistent look in the graphics sense. However, in further embodiments, parameters comprises a multiplicity of arrays of instructions. For example, in one further embodiment, each of the multiplicity of arrays provides a slightly different look to an "overall consistent" look, resulting in a multi-consistent look MCF. Additionally, in a second further embodiment, at least two of the multiplicity of arrays provide different looks, resulting in a multi-look MCF. In such embodiments, the selection of the array to use in rendering the characters can be preset and then user alterable. An advantage of such an embodiment is to provide economical storage of a multiplicity of looks.

Embodiments of the present invention also include parameters sections which contain transformation data that includes algorithms for deriving shapes and/or colors. For example, algorithms for deriving shapes includes algorithms for altering shapes to provide renditions of characters in an angled presentation and algorithms for deriving colors includes algorithms for interpolating colors, for example, to provide a fade. In addition, transformation data include algorithms for deriving color from shapes. For example, for a rendition where a look is achieved of a character disposed in the path of a light, a color closer to the light will be rendered differently from the same color disposed further from the light.

An embodiment of the present invention for use in providing multiple media output comprises a media section for providing time-varying content to the multiple media font, such as animation, video, sound, music, and the like. The media section is an array configured much like the imagearrays and drawingarray sections are configured, but it may contain additional information that identifies the format of the information and/or providing the means—or an identifier of the means—to "play" it back or render it. Each element of the array is referred to as a channel. More than one channel may be active simultaneously. Such time-varying content is stored on media such as, but not limited to, tape, disk, CD-ROM and the like.

The media section may contain references to information coded in other sections of the MCF. For instance, in one embodiment, the media section contains an animation of a little race car which speeds around the perimeter of a letter shape defined in basefonts. Further, the playback provided for by this media section may be referred to, affected, controlled or otherwise conditioned by other sections of the MCF. For instance, the media section could contain a video sequence which is only displayed inside a clip region shaped as the portion of a letter, such clip region having been set up by the parameters section. A channel may contain several contents, one of which is selected as a function of the character being rendered.

An embodiment of the present invention for use in providing multiple media output comprises a timing section for controlling the playback of time-varying information. The timing section comprises, for example, an array of selectable "scripts"—or identifiers thereof—which control the flow of action. Scripts may consist of multiple directives and/or other scripts and/or references to other scripts. Multiple scripts may be active at one time, for instance one controlling the music, a second controlling an animation and a third controlling a video playback. Scripts may also be selected or activated by via control mechanisms or APIs. The timing section may refer to information coded in other sections; for example it may play music for a duration of "the number of seconds contained in the $2^{nd}$ element of the details section."

The directives in the timing section control various specifications of the action and the time at which they occur. Action specifications include, but are not limited to, volume, pitch, speed, channel selection, fadeout, and the like. The actions can be designated to be controlled by internally-generated events such as, for example, a certain amount of time elapsing or the page containing the font being displayed. The actions can also be controlled by external events such as, but not limited to, mouse clicks, keypresses or network messages. Actions can also be controlled by one or more "triggers" which are activated by an API formatted call. Different actions may also be selected as a function of each specific character that is being rendered. Actions may be recurring or may be one-shot. Further, the timing section can specify that certain actions will only be performed when the MCF is displayed on specified device types. For example, a laser printer cannot render music.

The following describes how MCFs are utilized to render characters. In operation, an MCF engine sequentially examines each API formatted, user program request to render a character code. For each character code, the MCF engine determines whether a character is within a group of characters representing printable characters or within a group of characters corresponding to control signals. In accordance with the present invention, there are several types of control signals. Although the following describes the use of control signals in the form of single control characters for ease of understanding, the present invention is not limited to control signals comprised of single control characters. For example, the present invention includes embodiments wherein the control signals comprises groups of control characters or even groups of printable characters. For each control signal, the MCF engine will cause changes in variables contained inside the graphics context based on the value of the character code, but will not cause the MCF engine to display the character or characters indicating the control signal directly.

In the case of a "set background color to current" control signal (typically a single control character), a variable containing the background color is set to the currently-active default color in the graphics context. The background color variable is available to subsequent MCF characters displayed in that graphics context.

In the case of "set background to given color" control signals (typically, each is a single control character), there are actually a set (usually a consecutive range) of control characters that each perform the same function but with different colors. Each different control character sets a background color variable to a predetermined color value in the graphics context.

In the case of a "set color scheme to current" control signal (typically a single control character), the currently-active PostScript™ programming language default color is mapped to a color scheme identifier according to a predetermined mapping. For instance, all shades of red could be mapped to 0, all shades of green mapped to 1, etc. The color scheme identifier is stored in a variable that selects the color scheme within the graphics context that will be active during the subsequent displaying of MCFs in that graphics context.

In the case of "set color scheme to given" control signals (typically, each is a single control character), there are a set (usually a consecutive range) of control characters that each perform the same function but with different color schemes. Each different control character sets an active color scheme variable to a predetermined color scheme identifier in the graphics context. It is possible to have two or more groups of control characters which each separately control the colors of different graphic elements, or groups thereof, within an MCF.

In the case of a "set character look" control signal (typically a single control character), a variable containing the current character look. The current character look variable is available to subsequent MCF characters displayed in that graphics context.

In other embodiments of the present invention, user documents contain embedded MCF related information which are transmitted to the MCF engine when the characters are to be rendered. In principle, such user-program-embedded information can be any information that is germane to the MCF such as, for example, identifier of a particular color scheme.

If a character code represents a displayable character, the MCF engine must do what is necessary to display the character. It does so by sequentially retrieving each coded instruction in the parameters section of the MCF and performing the operations specified by those instructions and their operands. The displayed results of the instructions may be modified by the constraints specified in the hints section.

Specific lists of instructions that may be specified in parameters, their operands, and the coding scheme used can be developed in accordance with methods well known in the art. In particular, the instruction set includes operations sufficient to describe paths, colors, algorithmic operations thereon, graphic operations, and other special looks. The instruction set also includes elementary control flow, arithmetic and assignment instructions which are currently unused but can be used to implement font features that were not otherwise provided for in the original MCF engine design.

Further to rendering static screen elements while rendering a character, the MCF engine must also initiate the playback of any action that is provided for by the timing and media sections. As is well known in the art, the MCF engine may create a separate "process" to complete time-varying action in cases where rendering the action could cause delays. Rendering of the action may utilize renderers built into the MCF, the MCF engine, available via a network, or available from the platform the MCF is running on.

MCF-aware applications may also use certain new MCF-specific API calls to better support MCFs. The new MCF-specific API calls include functions for selecting or modifying the color schemes available in an MCF, manually selecting colors for the various elements of the MCF, reading back some of the information in the MCF, specifying speed vs. quality tradeoffs, and controlling and querying miscellaneous MCF-specific behavior and information. The additional MCF routines and their APIs are implemented, for example, either by adding them to the operating-environment if built in, or by packaging them into a separate program or subroutine or object library (built in or operating-environment extension) to which the user program can link. For example, in one embodiment, the additional routines are user interface programs and an API that reads data out of the MCF and receives user input to change the MCF, for example, the color schemes, the algorithms, and so forth. The following sets forth some of the items that can be created and changed using a user interface fabricated in accordance with methods well known in the art.

1. EnumerateColorSchemes—returns the number of color schemes a given MCF contains, along with a listing of the various color schemes and the colors of which they are comprised. Human-readable descriptions of colors and/or color schemes are also returned if present.

2. AddColorScheme—temporarily adds or makes available to an MCF a color scheme or substitutes a supplied color scheme for a color scheme contained in an MCF.

3. SelectColorScheme—selects the currently active color scheme for a given MCF, be it one of the color schemes contained in the MCF or a color scheme created by SetColorScheme.

4. SetFadePrecision—sets the frequency or count of color steps that are required to achieve a given look, such as Fades, Chrome Wire Effects, Extrusions, Glows, and so forth for variable-resolution MCFs.

5. SetColorMask—modifies MCF rendering so that only elements that are "painted" with a given color or colors in a color scheme are rendered. This function is used, for example, with on-screen dialogs where a user interaction creates a new color scheme since it enables the user to see which portions of a character will be affected by changing a given color in the color scheme.

6. GetImagePortion—retrieves images that may be embedded in an MCF. Human-readable descriptions are also returned if present.

7. SetImagePortion—temporarily adds or makes available a supplied image to an MCF or substitutes a supplied image for an image contained in an MCF.

8. GetDrawingPortion—retrieves any drawings or paths that may be embedded in an MCF. Human-readable descriptions are also returned if present.

9. SetDrawingPortion—temporarily adds or makes available a supplied drawing to an MCF or substitutes a supplied drawing for a drawing contained in an MCF.

10. GetBaseFonts—retrieves one-color fonts, or font names, embedded in an MCF. Human-readable descriptions are also returned if present.

11. SetBaseFonts—temporarily adds or makes available a supplied font or font identifier to an MCF or substitutes a supplied font or font identifier for one contained in an MCF.

12. SetBackgroundColor—sets an MCF's background color.

13. SetTransparency—sets the overall transparency of the font.

14. GetFriendlyDescription—retrieves the text of a user-friendly description of the MCF embedded in the MCF.

15. GetParameters—retrieves coded instructions that comprise the MCF's logic. Human-readable descriptions are also returned if present.

16. SetParameters—temporarily substitutes or makes available supplied coded instructions for those contained in an MCF.

17. GetDetails—retrieves one or more entries in the details section of the MCF. Human-readable descriptions are also returned if present.

18. SetDetails—temporarily adds or makes available the supplied information to the details section of the MCF, or substitutes the supplied information for information contained in the details section.

19. SetLook—sets an MCF's look for a multi-look MCF.

20. GetMedia—retrieves one or more entries in the media section.

21. SetMedia—temporarily adds or makes available the supplies information to the media section of the MCF, or substitutes the supplied information for the information contained in the media section.

22. GetTiming—retrieves one or more entries in the timing section.

23. SetTiming—temporarily adds or makes available the supplied information to the timing section of the MCF, or substitutes the supplied information for information contained in the timing section.

24. TriggerAction—triggers one of the API-triggerable events in the timing section.

25. StopAction—stops all action.

26. GetMultiple—sets, adds or makes available information from multiple specified sources; has the same effect as multiple calls to the various Get . . . functions above. This function can be used to get a set of information from a MCF in order to prepare said information prior to storage in a file.

27. SetMultiple—sets or adds information to multiple portions of the MCF; has the same effect as multiple calls to the various Set . . . functions above. This function can be used to modify a MCF per a set of specifications contained in a stored file. This stored file can be used for example, to provide a "corporate look" to character output.

The following describes an embodiment of the inventive MCFs for use in a network. Computer network browsers such as, for example, Netscape's Mosaic can access "plug-in" MCFs (described below in the context of an "applet"); can have MCFs and/or an MCF engine built into the browser; or use MCFs and/or an MCF engine built into a users platform using an appropriate API formatted call. However, to do this, it is necessary to provide a mechanism for compatibility with existing network standards and browsers. The current mechanism for providing a "plug-in" MCF is an "applet," a computer program that is automatically executed when a document containing a reference to the applet is displayed by a browser.

The following is an overview of the process using an applet. A user activates a link to a network page (document) containing characters to be rendered using MCFs. This activation causes the user's browser to retrieve the document from the appropriate network site. The document, in turn, contains further links to an MCF engine and an MCF file that are used to render the appropriate text in the document. The user gets the document displayed, with text showing up in full color.

The following is a detailed description of the process using an applet. Network documents are typically coded in the Hypertext Markup Language (HTML), described in a document by T. Berners-Lee and D. Connolly entitled "*Hypertext Markup Language—2.0*", *Internet Engineering Task Force,* Sep. 22, 1995. http://www.w3.org). Notably, HTML contains text formatting instructions and control commands, but it does not contain embedded images, programs or other objects. Instead, it contains links to such files on an appropriate network server. In practice, a browser retrieves an HTML document from its server and immediately formats and displays the text with placeholders inserted in the spaces that images and other elements will occupy. Once the user has something to look at, the browser then goes about the time-consuming task of retrieving and displaying the images and other objects that the document's links specify.

One of the elements found in HTML documents is the "applet," which is a computer program the browser retrieves and executes given program arguments contained in the HTML document. An applet is included in a document with an <APPLET> tag. For example, MCF text can be specified with the following HTML statements:

```
<APPLET codebase="fontclasses" code="MCFEngine.class" width=100 height=20>
  <PARAM name="TextToDisplay" value="Rainbow Pot 'o Gold">
  <PARAM name="FontFile" value="StripedFont.mcf">
  <PARAM name="Height" value="20">
  <PARAM name="ColorScheme" value="1">
  <PARAM name="Transparency" value="50%">
  <PARAM name="Basefonts" value="Helvetica, Arial, Avantgarde">
  <PARAM name="Palette" value="1 :red, cyan, lime">
  <PARAM name="Details" value="1, 2, 3">
  <PARAM name="Media" value="Somewhere over the Rainbow.song">
  <PARAM name="Timing" value="CRT, Immediately, Repeat Forever">
Rainbow Pot 'o Gold
</APPLET>
```

In this example, the program named MCFEngine.class (an MCF engine written in the Java language) will display the text "Rainbow Pot 'o Gold" in a font named StripedFont, 20 units high, in the color scheme designated as number 1. Additionally, a basefont will temporarily be added to the MCF; the name of that basefont will be the first one-color font in a predetermined list which is available on the local computer. A new color scheme will temporarily replace color scheme number 1 in the font—it consists of an array of three colors. If displayed on a video display, "Somewhere over the Rainbow" will repeat ad infinitum.

Note the next-to-last line just before "</APPLET>." This is the same text as the value of the TextToDisplay parameter that will be provided to the MCF engine, but it has a different function here. The text will be displayed in one color by the browser as a placeholder until the applet is executed. When it executes, the MCF applet will precisely overprint the placeholder text—but in multiple colors—if the font and size of the placeholder were correctly chosen. Note that the above-mentioned text need not be actual text, but may consist of arbitrary HTML commands which may perform arbitrary actions, for example, display a bit-mapped image of the rendered results on systems that do not support MCFs.

The actual applet is a simple application which either contains an embedded, standard, stand-alone MCF engine, or assumes that the operating-environment has a built-in MCF engine. As a convenience to HTML document designers, the MCF applet may also perform some functions not strictly related to the multicolor aspect of the text, such as rendering text at an angle. The extra functions are controlled by additional <PARAM> statements.

When executed, the applet simply (a) decodes the HTML-supplied parameters and passes them through to the MCF engine via its API formatted calls; (b) retrieves the MCF file from the server and temporarily installs it into the operating-environment or into the MCF engine via appropriate API formatted calls; (c) retrieves one-color fonts referenced by the MCF; and then (d) renders the supplied text by making the appropriate API formatted calls.

There is no guarantee that a given one-color font in a basefonts section will be present on a given networked computer. To alleviate this problem, a list of acceptable fonts may be specified—the MCF engine chooses the first locally-available font in the list (this is done, for example, using a font matching scheme like the Panose system referred to above). Additionally, in a networked MCF implementation, the basefonts section of the MCF (described in detail above) may contain not only the names of alternate one-color fonts but it may also include (either or both of the names and) a network link to a file on the server which contains the alternate one-color fonts. Since retrieving an entire font (50–80 kilobytes) can be time-consuming, the font can be split into many smaller files containing one, or a few, character(s) which the applet can selectively retrieve, depending on the characters in the displayed text.

A typical time-saving trick that browsers implement is to keep a certain number of recently-accessed documents and linked objects on the local computer's disk, otherwise known as caching. If a file on the local disk matching a linked file's name and date is found, it is retrieved from the local disk instead of being retrieved it from the (slower) network. It is the caching mechanism which makes building a MCF engine into an applet viable, since the MCF applet is quite large and thus slow to transmit over a network. Since the MCF applet will be subsequently retrieved from the disk once it has been retrieved from the network, performance is very good. The same is true of MCF files.

In further embodiments in a network environment, the MCF engine or a mechanism to access an MCF engine can be built into the network browser or the HTML language (or any future network protocol or document language) can be extended to transfer the information to the MCF engine that was, as described above, passed thereto by the applet. In still further embodiments in a network environment, the network document contains an identifier of code that exists on the user's computer or code that exists in the browser or code that exists somewhere in the network. The identifier is used to retrieve the code and execute it to interface with an MCF engine. Further, the MCFs themselves can be located anywhere; the local computer or anywhere in the network. Lastly, the present invention is not limited to the use of applets and is more generally directed to the class of network plug-ins, of which the applet is but one example.

The following describes several specific types of MCFs that are fabricated in accordance with the present invention. In particular, the following describes: (a) "variable resolution" MCFs (producing looks such as, for example, fade, chrome wire, and extrusion); (b) "overlap" MCFs; (c) "image" MCFs; (d) "drawing" MCFs; and (e) "multi" MCFs. Although the following describes these specific types of MCFs as producing single types of looks for ease of understanding, the present invention is not thusly limited and includes MCFs that are used to produce combinations of the below-described looks.

First follows a description of "variable-resolution" MCFs. Certain classes of looks provided by using MCFs are produced by repeatedly "overprinting" (in the graphics sense) a slightly-different graphic many times. A first of such class of looks that are produced by repeatedly overprinting a slightly different graphic many times is a fade; for example, a character rendering wherein a character fades from a darker color to a lighter color, for example, top-to-bottom. In accordance with the present invention, a fade is rendered by first setting up, for example, a clipping mechanism such as a "clipping area" within a rectangle. As is well known, a clipping area is like a stencil, i.e., it prevents any color from "sticking" anywhere outside the outline of the letter and is fabricated in accordance with methods that are well known in the art. Then, the fade is rendered by printing (in the graphics sense), successively darker, thin horizontal slices of the character over the rectangle enclosing the clipping area or by printing, successively paler, thin horizontal slices of the character enclosing the clipping area, all in accordance with methods that are well known in the art. As one can readily appreciate, the fade may also be achieved by utilizing a clipping area which is a thin rectangle. In this embodiment, the character is printed with successively paler colors and the clipping area is moved as the successive printing is done. In further embodiments, the clipping mechanism can include a clipping area that provides transparency. Such a clipping area enables one to specify the extent to which "ink will stick" in various portions of the clipping area. Such a clipping area also enables one to "feather" the edges of the clipping area to produce certain looks.

In a further alternative, a fade made be produced by laying down a clipping area and by printing the character while successively shrinking the clipping area, for example, by shrinking the clipping area in place or by shrinking the clipping area towards or from one end of the character. In a still further alternative, for an operating-environment that supports transparency, one can produce the fade by overprinting successive portions of the character while successively varying its transparency.

It is important to note that a method for background color control should be provided to produce the above-described fade effect because of the following. Many operating-environments, including the above-described PostScript™ programming language operating-environment, do not support the concept of "transparency." That is to say, every character or figure is rendered so that it completely obscures what is "underneath" the character or figure. This causes a problem, for example, when creating the above-described fade effect because, the fade effect breaks down if the background against which the character is printed is not white. In an ideal fade, to best simulate the character's becoming progressively more transparent, the color should fade from a given color to the color of the background. To do so, the MCF (or MCF engine) must be able to determine the background color. However, most operating-environments do not provide the ability to do so. Hence, for those operating-environments, the user must provide the background color to the MCF. This is done in accordance with the present invention in several ways. In one embodiment, the user selects the on-screen color of the MCF to be the same as the background color. In this embodiment, the MCF uses the current system color as the fade-to color. However, this is not useful for the PostScript™ programming language Type 3 format font embodiment described above because the stand-in fonts are normally displayed on the computer terminal screen in one color—that of the current system color—and would be invisible. Therefore, in accordance with the present invention, as described above, the user places a non-printing control character that corresponds to a system color that is the same as the background in front of each word or phrase. The control character is not printed and, as a result, the rest of the word can be rendered in any screen-visible color on a computer display screen. However, the screen-visible color will be ignored by the MCF and the MCF picks up the fade-to color from the system color in effect at the time it processes the control character.

Lastly, the fade effect produced by repeatedly printing a slightly different graphic offset from the previous one in order to achieve a color-transition look typically requires a method of interpolating the colors of the elements between the two extrema, i.e., the starting color and the ending color. For example, the method of interpolating can be a straight linear interpolation of the RGB components. However, this may not be optimal since this method can yield intermediate colors that are not perceived by a human as being "between" the two colors. Thus, in one embodiment, colors of the two extrema, i.e., the "end" colors, are first converted to another, more suitable color space by using standard computer graphics formulae (see a book by J. Foley et al. entitled "Computer Graphics: Principles and Practice"—$2^{nd}$ Edition, Addison-Wesley, 1990, ISBN 0-201-12110-7). Next the end colors are interpolated in the converted space. Finally, the results of the interpolation are converted back to the original, or other suitable, color space. For instance, the HSB color space yields acceptable interpolations. Further, the color may be linearly interpolated or may be calculated from an arbitrary function. As one can readily appreciate, for embodiments which support transparency as being part of the definition of color, such interpolation can include transparency interpolation.

A second of such class of looks that are achieved by repeatedly overprinting a slightly different graphic many times is a chrome wire look or glow look. In accordance with the present invention, a chrome wire look is rendered by stroking the outside outline of a character with progressively thinner lines which get progressively lighter in accordance with methods that are well known in the art to simulate the look of light reflecting from the wire.

A third of such class of looks that are achieved by repeatedly overprinting a slightly different graphic many times is an extrusion look which extrudes a character to provide it with a three-dimensional look. In accordance with the present invention, an extrusion character is rendered by repeatedly printing the same character offset by an increasing, small distance in accordance with methods that are well known in the art. In addition, the color may change during the offset (for example, fade from darker in front to lighter in back in accordance with techniques described above) to provide more depth to the look.

In all of the above-described class of looks that are achieved by repeatedly overprinting a slightly different graphic many times, it is important for the MCF designer to determine the number of steps needed to produce a smooth-looking look. Using too many steps will cause an MCF to render very slowly and using too few steps will produce "jaggy" renderings or distinct color bands. Since MCFs are scalable to multiple sizes and device pixel resolutions, the determination of the number of steps depends on the: (a) resolution of the output device; (b) size at which the character is to be rendered; and (c) range of colors that a fade goes through. These data are usually unknown when the MCF is designed. However, in accordance with the present invention, to produce the desired rendering, the MCF specifies the step frequency in terms of steps per inch, or other distance unit on the output device, or alternately in output-device pixels. Alternately, the MCF may specify the step frequency in terms of distance on the output per step. The MCF (or MCF engine) converts the step frequency into MCF-internal units at the time the character is rendered, taking into account the current font size and device resolution. For example, the boilerplate MCF section (or MCF engine) converts the step frequency into the number of steps by multiplying it by the height of the character on the output device. The boilerplate MCF section (or MCF engine) also determines the number of discrete color steps between the beginning and end colors, depending on the device's color resolution. To do this, for example, the multi-component color values are converted to a scalar. Two workable schemes are either (a) to convert the colors to gray using standard computer graphics formulae (see a book by J. Foley et al. entitled "Computer Graphics: Principles and Practice"—$2^{nd}$ Edition, Addison-Wesley, 1990, ISBN 0-201-12110-7), or (b) to select a color component that varies most between beginning and end. Note that it may be necessary to perform multiple conversions between color spaces to arrive at a color space that can be converted to a meaningful scalar. For instance, it might be necessary to convert a color expressed in the HSB color system to RGB, then to gray. In cases where there is little color variation, the number of steps is further reduced to the number of color steps, since it would be pointless to print several adjacent bands in exactly the same color.

The following C-language-like code fragment illustrates the computations involved:

```
float givenDeviceResolution = 300; // output device's resolution,
    in pixels per inch
float givenCharacterHeight = 15; // rendered character's height,
    in inches
float givenRequestedStepFrequency = 100; // number of steps per inch
int givenTopColor[] = [20, 10, 5]; // RGB value of top of character,
    in device units
int givenBottomColor[] = [100, 150, 5]; // RGB value of bottom of
    character, device units
        int stepCount = requestedStepFrequency * characterHeight;
        int i;
        int maxGrayVariation = 0;
        for (i = 0; i < 3; ++i)
            if ( abs(givenTopColor[i] - givenBottomColor[i]) >
            maxGray Variation[i])
                maxGrayVariation = abs(givenTopColor[i] -
                givenBottomColor[i]);
            if (stepCount > maxGray Variation)
                stepCount = maxGray Variation;
            int stepSizeInPixels = max(1, (givenDeviceResolution *
            givenChararacterHeight)/stepCount);
```

Figure 3:
FIG. 3 shows, in pictorial form, a rendering of several characters of text using an overlap multiple color font ("MCF") in accordance with the present invention.
Figure 4:
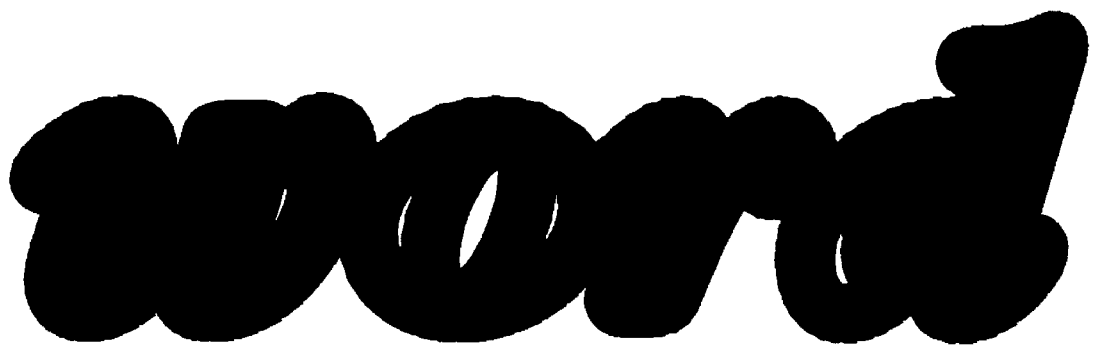
FIG. 4 shows, in pictorial form, an extremely fattened version of the text shown in FIG. 3.
Figure 5:
FIG. 5 shows, in pictorial form, the result of rendering a less fattened version of the text shown in FIG. 3 on top of the rendering shown in FIG. 4 to leave a single black outline.

Second follows a description of "overlap" MCFs. A first embodiment of an overlap MCF produces a multiplicity of overprintings (in the graphics sense), one on top of each other, in succession. Consider the look produced in FIG. 3 by the first embodiment. In accordance with the first embodiment, a first rendering is made, in black, of an extremely fattened version of the characters in the word—yielding a rough black blob, such as that shown in FIG. 4. A fattened character can be produced in accordance with methods well known in the art. Those methods include stroking the character outline with a very wide line, or by enlarging the character and repositioning it. Second, a less-fattened version of the same text is rendered in accordance with methods well known in the art in white (or a background color) on top of the first rendering in black, leaving a single black outline, see FIG. 5. Third, a third, relatively thin version of the same text is rendered in accordance with methods well known in the art, for example, in a color such as green, on top of the first rendering in black and the second rendering in white, yielding green letters with a single black "case" outline around the entire text, but not touching it shown in FIG. 3 (the reader can readily imagine the green color).

As one can readily appreciate, the first embodiment of an overlap MCF works well if each of the above-described steps is performed on the entire word as a unit. However, in a typical case, an MCF is activated one character at a time. In that case, when the second letter is rendered, the black line from the second character overlaps the first letter instead of showing the desired look of eliminating the "inside" black lines. A similar problem manifests itself in many different ways whenever multi-layer characters overlap, but the same inventive solution can be used in all such cases.

Figure 6:
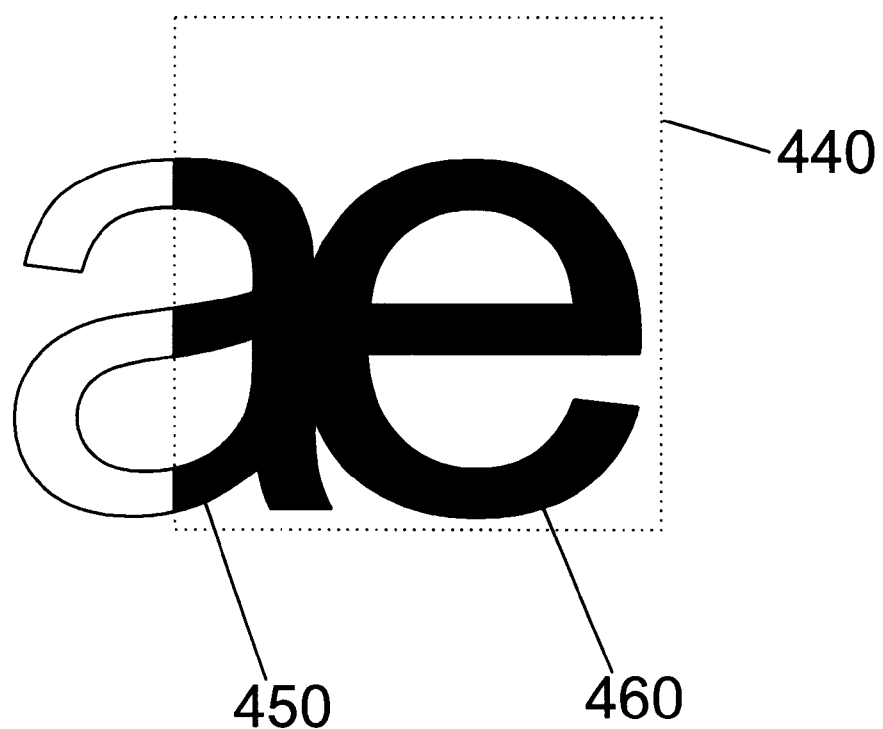
FIG. 6 illustrates, in pictorial form, a clip-save feature of an inventive overlap MCF.

In accordance with a second embodiment of an overlap MCF, the MCF (or MCF engine) "remembers" the last few characters that were rendered, as well as their positions on a page. Then, when the next character is rendered, the MCF (or MCF engine) first creates a clipping area that is like a stencil (for example, in the shape of a rectangle). The clipping area protects the rest of the display area from having a display placed thereon, except for the rectangular clipping area enclosing the character to be rendered and the right half of the previous character. FIG. 6 illustrates the clipping-area-save embodiment wherein clipping area 440 surrounds current character 460 and a portion of previous character 450. In accordance with this embodiment, the MCF (or MCF engine) renders each layer of the right portion of previous character 450 (the left portion was previously rendered) and all of current character 460 at the same time. The result is to produce the correct overlap between the two characters without adversely affecting the left half of the previous character. Note that one half of the previous character is arbitrarily re-rendered, but the same result could be achieved by using different fractions of the previous character. This embodiment of an overlap MCF is implemented by creating "one-and-a-half" variants of the appropriate MCF instructions or subroutines, or by utilizing program arguments or operands that modify the behavior of the MCF instructions or subroutines; all in accordance with methods well known in the art. The same result can also be achieved by defining instructions or subroutines that set and clear a global "one-and-a-half" variable in accordance with methods well known in the art that affects the behavior of all subroutines or instructions. In addition, the present invention includes embodiments where the above-described (clipping-area-save:re-rendering) technique is utilized to render characters that are disposed in various orientations with respect to each other (other than side-by-side) such as, for example, an orientations wherein the characters are disposed one on top of the other. Of course one can use clipping areas that support transparency, in which case previously rendered characters are only partially protected.

Third follows a description of "image" MCFs. In accordance with the present invention, image MCFs produce a look similar to that created by cutting shapes from a photograph. The shapes can be the outlines of characters, or they can be ornaments disposed in or around the characters. In all cases, the look is implemented by use of a clipping mechanism such as, for example, a clipping area in the shape of the character or ornament in accordance with methods well known in the art. The clipping area is like a stencil that protects the rest of the display area from being displayed on, except for the area enclosed by the clipping area. In accordance with the present invention, the pixmap itself may include transparency. Thus, in one embodiment of the present invention, each element in the pixmap includes, for example, eight (8) bits for each of three colors and eight (8) bits for transparency.

A digitized monochrome or black and white photograph or color photograph (pixmap) is rendered over the outline, for example, a rectangle, enclosing the clipping area in accordance with methods well known in the art. The pixmap may also be repeatedly rendered over adjacent portions of the enclosing rectangle (tiled) in accordance with methods well known in the art, if necessary to fill the entire rectangle The look provided is that the character or ornament appears to have been cut from the digitized artwork.

Fourth follows a description of Drawing MCFs. Drawing MCFs are identical to image MCFs, except that a drawing instead of a pixmap is rendered over the enclosing rectangle. A drawing differ from a pixmap in that a drawing contains coded curves and lines that define geometric figures instead of individual pixels.

Fifth follows a description of "multi" MCFs. The following describes font components used in multi MCFs. The characters in some MCFs can be thought of as drawings created with a fixed number of colors. One popular technique for reproducing such drawings using ink and paper is to make separate printing plates for each color in the drawing, each plate containing only those areas appearing in a certain color. Paper is then sequentially printed using the plates, each plate bearing ink of a different color. An analogous technique is used in the multi MCFs. Each character is broken down into its component colors and the components are sequentially printed in the proper colors in accordance with methods that are well known in the art by the MCF (or MCF engine). The special power of the multi-MCF that each component can be contained in a separate monochrome font; monochrome fonts being easy to create by using popular software.

Although the examples provided above for specific MCFs referred to overprinting to produce fonts, that is only one method for rendering characters utilizing multiple steps to provide multiple effects. In other embodiments these renderings can be carried out by keeping track of pixels that have been "finally" rendered so as not to require an overprinting of pixels.

Figure 10:
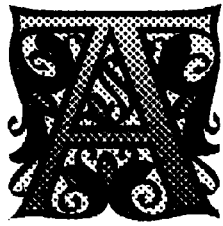
FIG. 10 shows several examples of characters rendered utilizing embodiments of the inventive MCFs.

FIG. 10 shows several examples of characters rendered utilizing embodiments of the inventive MCFs.

As those of ordinary skill in the art will readily appreciate, references above to the functions carried out by the MCF (or MCF engine) generally refer to functions commonly performed for all characters for the font, such as, for example, by the boilerplate section for the PostScript™ programming language Type 3 format fonts.

As those of ordinary skill in the art will readily appreciate, multiple media fonts can be embodied in a manner that is similar to the embodiments described above wherein, for example, the definition of color scheme data is expanded to further comprise audio data for use in producing audio output, fragrance data for use in producing olfactory output, tactile data for use in producing textured output, and so forth. Further, such embodiments of multiple media fonts contemplates the use of additional information in the form of texture arrays which comprise three (3) dimensional digital information specifying shapes and textures.

Finally, in accordance with the present invention, certain embodiments provide "low quality" rendering for fast viewing or for previewing output. In one such low quality rendering embodiment, the characters are rendered without fill, i.e., the insides of characters are left unfilled. In another such low quality rendering embodiment, characters are not rendered using images. In still another such low quality rendering embodiment, characters are rendered without predetermined portions of the high quality, full rendering output look.

Those skilled in the art will recognize that the foregoing description has been presented for the sake of illustration and description only. As such, it is not intended to be exhaustive or to limit the invention to the precise form disclosed. For example, although embodiments of the present invention have been described using index arrays that are accessible by number, the present invention is not limited to such embodiments. In fact, the present invention includes retrievable collections of elements such as index arrays that are accessible by name (as well as by number); and include many other data storage mechanisms well known in the art such as, but not limited to, hash storage and so forth.

Further, although embodiments of the present invention have been described utilizing MCF engines which are extensions to an operating-environment and MCF engines which are contained as an integral part of the operating environment, the present invention is not limited to such embodiments and further includes MCF engines which are connected to application programs. In such an embodiment, the MCF engine may be configured as a library and the operating-environment generates an MCF engine subsystem that is accessed by the user programs like a subroutine. In such an embodiment, the MCF engine generates pixinaps that are stored, passed to another program, passed to an output device directly for printing, sent to a destination over a network, transmitted to the operating environment for transmission, in turn, to an output device, and so forth.

Still further, although embodiments of the present invention were described utilizing the Internet, the present invention is not limited to such an embodiment and includes embodiments for use in all manner of computer networks, including, without limitation, Intranets.

Yet still further, although embodiments of the present invention were described utilizing computer systems, the present invention is not limited to such embodiments and includes embodiments for use in any system that can be used to render characters such as, for example without limitation, a printer.

Yet again still further, as one can readily appreciate, the MCFs described above can be stored on computer-readable media, both for storage as well as for transportation purposes. Such computer-readable media comprising, without limitation, hard disks, floppy disks and CD-ROMs, ROMs, tape, encoded on paper tape, encoded in any manner for use with optical input devices, and so forth. In further embodiments which are platform dependent, an MCF is compiled into executable instructions and, for example, configured as a part of a computer program.

Yet once again still further, embodiments of the present invention include rendering techniques wherein characters are rendered after several characters have been requested to be rendered, for example, after a word. Such embodiments include delayed rendering at a later time, predetermined or specified.

APPENDIX A

```
%!PS-AdobeFont ArtDeco
%%BeginFile:color.ps
%
% Copyright (C) 1996 John Desrosiers. Ml rights reserved
%
15 dict begin           % one bigger for definefont's FID
/FontName /ArtDeco def
70 dict begin
  /basefonts
  [
    /BibiNehruSH
  ]
  def
  /parameters
  [
    [
      5 dict dup begin %outermost stripe
        /color {palette 3 get exec} def
        /linewidth 0.020 def
      end
      5 dict dup begin %innermost stripe
        /linewidth 0.04 def
        /color {palette 2 get exec} def
      end
      {inlineeffect}
    ]
    [
      2 dict dup begin %fade bottom to top
        /color
        [
          {palette 1 get exec}
          {palette 0 get exec}
          [0.0 .2 1.0 .2]
          [0.0 .6 1.0 .6]
        ]
        def
      end
      2 dict dup begin %actual letter bottom part
        /color {palette 1 get exec} def
        /clip
        {0--.1 moveto 0.4 lineto 1.4 lineto 1–1 lineto closepath clip}
        def
      end
      2 dict dup begin %actual letter top part
        /color {palette 0 get exec} def
      end
      {filleffect}
    ]
    [
      {grestore}
      1 dict dup begin %dropshadow to bottom right
        /color {palette 3 get exec} def
      end
      {filleffect}
    ]
    [
      5 dict dup begin
        /offset [.035—.035] def
      end
      {setgraphicsmode}
      {gsave}
      [%innerFillTop innerFillBottom innerOutline outerOutline/Extrusion
        [{1 setgray}{.8 1 .8 setrgbcolor}{1 setgray}A0 setgray]%mint green
      ]
      {param1 setpalette}
      {0 setupfont}
    ]
  ]
  def
% fills
% dict w/keys:
% clip = proc specifying path which this'll be clipped to
% color = i) proc which sets up a single solid color
%         ii) fade array:
%            [<from color><to color><from line array><to line array>]
% offset = 2-element array containing offset where to render
% in/out/onlines
% dict = solid line, [5] fade, [2] = line w/fade
% for line's outline & filling
/param1 0 def
/param2 0 def
  temp128 templength 3–1 roll putinterval
  /templength dup load 3–1 roll add def
}
if
temp128 0 templength getinterval % . . . basefont namestr
/param11 0 def
/param12 0 def
/param21 0 def
/param22 0 def
```

APPENDIX A-continued

```
%If base fonts are names, look up actual fonts
0 1 basefonts length 1 sub
{
basefonts 1 index get
dup type /nametype eq
{
findfont   %number font
basefonts 3 1 roll put
}
%else
{pop pop}
ifelse
}
for
% <painttype><strokewidth><encoding><font> derivefont <font'>
%
% Find/create derived font with appropriate line width, encoding
/initialEncoding basefonts 0 get /Encoding get def
/derivedfontnames 100 dict def
/temp128 128 string def
/templength 0 def
%
/derivefont
{
3 index 2 eq
initialEncoding 2 index ne or
{
%find/create derived font when outlined/reencoded font
dup /FontName get temp128 cvs length/templength exch def % ... basefont
3 index 2 eq
{
2 index ( ) cvs dup length exch % ... basefont len str
temp 128 templength 3-1 roll putinterval
/templength dup load 3-1 roll add def
}
if
initialEncoding Encoding ne
{
Encoding (    ) cvs %use encoding on stak
dup length exch
}
if
0 0 Encoding basefonts 5-1 roll get derivefont
setfont
}
bind def
% <num index into basefonts> <linewidth> setupstrokedfont --
%
% Set current font from index element of basefonts
/setupstrokedfont derivedfontnames 1 index cvn known not
{
% create derived font
dup length string copy cvn% . . . basefont name'
1 index length dict
begin
1 index
{
1 index/FID eq
2 index /UniqueID eq or
{pop pop}
%else
{
1 index /FontName eq {pop 1 index} if
1 index /Encoding eq {pop 3 index} if
1 index /StrokeWidth eq {pop 4 index} if
1 index /PaintType eq {pop 5 index} if
def
}
ifelse
}
forall
currentdict
end   % . . . basefont name' fontdict
3-1 roll pop % . . . name' fontdict
1 index exch definefont% . . . name' font'
dup 3 1 roll% . . . font' name' font'
derivedfontnames 3 1 roll put% . . . font'
}
%else
{exch pop derivedfontnames exch get}
ifelse    % . . . font
if  %painttype strokewidth encoding font
4 1 roll pop pop pop %font
bind def
% <num index into basefonts> setupfont --
%
% Set current font from index element of basefonts
/setupfont
{
dup xcheck
{
gsave
currentpoint translate
exec fill
grestore
}
%else
{show}
```

APPENDIX A-continued

```
    {
    2 exch 1000 mul Encoding basefonts 5-1 roll get derivefont
    setfont
    } bind def % <shapeproc & charstr><baseshapes idx> setupshape <shapeproc & charstr>
%
% Set current shape from index element of baseshapes
/setupshape
    {
    /baseshapes load exch get
    1 index xcheck
       {exchpop}
       %else
       {3-1 roll pop exch}
    ifelse
    } bind def % <shapeproc & charstr><bool> enableshape <shapeproc & charstr>
%
% If true, make shape source of glyphs; else font
/enableshape
    {
       {dup xcheck not{exch}if}
       %else
       {dup xcheck {exch}if}
    ifelse
    } bind def % <shapeproc>|<charstr> glyphshow --
%
% Show charstr or fill shapeproc % <dict> setuplineparameters --
%
% Set graphics state up with values in dictionary
/setuplineparameters
    {
    1 setlinewidth 0 setlinecap 0 setlinejoin [] 0 setdash
    10 setmiterlimit   %don't define color on purpose
       {%key value
       1 index /color eq {dup exec} if
       1 index /dash eq {dup 0 setdash} if
       1 index /linecap eq {dup setlinecap} if
       1 index /linejoin eq {dup setlinejoin} if
       1 index /linewidth eq {dup setlinewidth} if
       1 index /miterlimit eq {dup setmiterlimit} if
       pop pop
       }
    forall
    } bind def
```

```
    ifelse
    } bind def

% <shapeproc>|<charstr> glyphpath --
%
% Get path represented by charstr or shapeproc
/glyphpath
    {
    dup xcheck
       {
       currentpoint
       currentpoint translate
       3-1 roll exec
       neg exch neg exch translate
       }
       %else
       {true charpath}
    ifelse
    } bind def % <shapeproc>|<charstr> protectcdglyphpath --
%
% Returns glyph & previous glyph in current path
/protectedglyphpath
    {
    dup glyphpath
    previouspoint
       {moveto previousglyph glyphpath}
       %else
       {pop}
    ifelse
    } bind def % <charstr><dict> setgraphicsmode --
%
% Set graphics state up with values in dictionary
/setgraphicsmode
    {
       {%key value
       1 index /clip eq
       {dup currentpoint 5 index 4-1 roll exec pop newpath moveto}
       if
       1 index /offset eq
       {dup aload pop currentpoint 4 2 roll translate moveto}
       if
       1 index /flatpercent eq %flatness relative to em square
       {
```

APPENDIX A-continued

```
% <dict> setupfillparameters [<fade array><true>]|[<false>]
%
% Set graphics state up with values in dictionary
/setupfillparameters
{
false exch %assume no fade array will be returned
{ %key value
1 index /clip eq
{dup currentpoint 3-1 roll exec newpath moveto}
if
1 index /color eq
{
dup xchek
{dup exec}
%else
{
%fade specified. Get rid of <false> on stak & put <dict><true>
3-1 roll pop
dup true 4 2 roll
ifelse
}
if
i index /offset eq {dup aload pop rmoveto} if
pop pop
}
% setrgbcolor to value it had on entry to this BuildChar
/rgbcoloronentry [0 0 0] def
/setrgbcoloronentry
{rgbcoloronentry aload pop setrgbcolor}
bind def
% -- settobackgroundcolor --
% Set current color to background color
/settobackgroundcolor
{1 setgray}
bind def
% ### setrgbcolor255
%
% Version of setrgbcolor that expects operands 0 . . . 255 instead of 0 . . . 1
/setrgbcolor255
{
3 {255 div 3 1 roll} repeat
setrgbcolor
}
def
% <frm clrproc><to clrproc><frm len><to len><step type/LPI> setupramp --
%
% Sets up color ramp iterator. When ramp is iterated later, each
dup 100 div dup dtransform
abs exch abs 2 copy gt {exch} if pop
%use smallest resolution if asymmetrical
dup 1 lt {pop 1} if
setflat
}
if
poppop
}
forall
}
bind def
% <array><index#> setpalette --
%
% Sets up 'palette' variable to contain index'th entry of array. If
% index> length of array, set up 0th entry.
/palette 0 def
/setpalette
{
1 index length 1 index ie {pop 0}if    %index = 0 if over limit
get /palette exch def
}
bind def
% -- setrgbcoloronentry --
/rampstep 1 index def
ramptype 0 eq
{pop 255}
%else
{
dup dtransform dup mul exch dup mul add sqrt 1.41 div
%tot %#pixels to sweep
ramptype 0 lt %interval based on # pixels only
{ramptype abs}
%else
{
% find out how many pixels per LPI
rampmatrix currenunatrix rampdefaultmatrix setmatrix
72 rampstep div dtransform dup mul exch dup mul add sqrt 1.41 div
%pix/line
dup 1 lt {pop 1}if
exch setmatrix %pixels_swept pixels_per_line
}
ifelse
div .5 add cvi %# lines to sweep = # steps
}
ifelse
/rampsteps exch def
% find largest color component variation
exch
gsave exec currentrgbcolor grestore
```

APPENDIX A-continued

```
% step of the ramp will be min(1 line screen, 1 gray shade).
% Stepdistance: 0: based only on color; +ve: LPI & color;
% -ve: based only on # pixels (pixels specified as magnitude)
/ramptype 0 def
/rampcurr 0 def
/rampto 0 def
/rampstep 0 def
/rampsteps 0 def
/rampcolor 3 array def
/rampcolorstep 3 array def
/rampmatrix matrix def
/rampdefaultmatrix matrix defaultmatrix def
/setupramp
{
    3 copy rampcolor astore pop  % store from color
    gsave 4-1 roll exec currentrgbcolor grestore
                    %fromR fromG fromB toR toG toB
    3 {4-1 roll sub 3 1 roll} repeat %distanceR distG distB
    3 copy 0 3
    {
        exch abs 2 copy lt {exch} if pop
    }
    repeat       %distanceR distG distB maxDist
    255 mul %convert to rgb255

% # steps = min(pixel steps, color steps)
    ramptype 0 lt {pop rampsteps} if
    rampsteps 2 copy gt {exch} if pop
    /rampsteps 1 index def    %distanceR distG distB #steps % set up color & distance steps based on computed # steps
    4 1 roll
    3 {3 index div 3 1 roll} repeat % find vectors from 2 ends of begin line going to end line
    1 index aload pop 4 index aload pop
        %xbeg1 ybeg1 xbeg2 ybeg2 xend1 yend1 xend2 yend2
    6-2 roll %xbeg1 ybeg2 xend1 yend1 xend2 yend2 xbeg2 ybeg2
    sub neg /fillydist2 exch def %xbeg1 ybeg1 xend1 yend1 xend2 xbeg2
    sub /fillxdist2 exch def %xbeg1 ybeg1 xend1 yend1 xend2 xbeg2
    3-1 roll %xbeg1 ybeg1 xend1 yend1 ybeg1
    sub /fillydist1 exch def %xbeg1 xend1
    sub neg /fillxdist1 exch def % find greatest distance between 2 line's endpoints & use
    % that as "width" passed to/from iterator
    fillxdist1 dup mul fillydist1 dup mul add sqrt
    fillxdist2 dup mul fillydist2 dup mul add sqrt
    2 copy lt {exch} if pop %greatest dist'tween endpoints % store endpoints & distance
    /fillmasterdistance exch def
    /fillendline exch def
    /fillbeginline exch def %setup iterator to iterate over master distance
    0 fillmasterdistance 100 setupramp
    {
        iterateramp
        gsave
        % new quadrilateral is (endpoint), line interpolated
        % between begin & endpoint
        fillmasterdistance div
        fillendline aload pop
```

```
% figure tentative # steps based on distance
/ramptype exch def
/rampto exch def
/rampcurr exch def
rampto rampcurr sub
rampcolorstep astore pop %#steps
rampstep exch div
/rampstep exch def
}
bind def % -- iterateramp {<curr len>true} | false
% Assumes setupramp was executed to set this up
% Returns false if termination condition reached.
%
% Gets next color/length value of ramp. Sets appropriate interpolated
% color & returns interpolated <len> value.
/iterateramp
{
    rampsteps dup 0 it
    {pop false}
    %else
    {
        %compute next step's color value & set it
        rampcolor aload pop
        3 copy setrgbcolor
        rampcolorstep aload pop
        3 {4-1 roll add 3 1 roll} repeat
        rampcolor astore pop
        % iterpolate distance
        /rampcurr dup load dup 3 1 roll rampstep add def %distance
        true
    }
    ifelse
}
def
```

APPENDIX A-continued

```
% <fade array> fadepath --
% current path is argument
/fadepath
{
    % Array: Fadeout effect. Setup char as clip, then sweep line
    % [<from color><to color><from line array><to line array>]
    gsave
    clip
    newpath
    aload pop
    %else
        {exit}
        ifelse
    }
    loop
    grestore
} bind def % -- previouspoint [<prevx><prevy>true] | false
% Returns false if no previous point, else prev point in curr space
%
% Compute origin point of previous char, but in current space
/previouspoint () def
/previousx 0 def
/originalx 0 def
/previousy 0 def
/originaly 0 def
/previouspoint
{
    previouschar ( ) eq
        {false}
    %else
    {
        % locate previous character *relative* to current space
        originalx originaly
        previousy exch sub previousx exch sub exch
        idtransform
        true
    } ifelse
} bind def % <curr charstr or shapeproc> previousglyph <curr shapeproc or prev charstr>
%
% Returns prev charstr or shape. Assume curr shape is same as prev shape.
/previousglyph
{dup xcheck not {pop previouschar}if}
bind def moveto lineto
    fillxdist2 1 index mul fillydist2 2 index mul
    fillxdist1 3 index mul fillydist1 5-1 roll mul
    fillbeginline aload pop
    4 2 roll
    5-1 roll add exch 5-1 roll add exch lineto
    3-1 roll add exch 3-1 roll add exch lineto
    closepath
    fill
    grestore
}
% which includes room for new character and the right half of the
% previous character.
/protecthalfprevious
{
    previouspoint
    {
        % make a box that includes curr char + halfway between curr
        %point & prev point
        currentpoint 4 2 roll
        newpath
        0 1 moveto 1 1 lineto 1-.5 lineto 0-.5 lineto%box around curr
        originalx originaly itransform .5 sub lineto %back to abs origin
        exch 2 div exch rlineto
        0 1.5 rlineto
        closepath
        clip newpath
        moveto
    } if
} bind def % <mark>[<parameter dict>] . . . fillpath --
%
% Render filled version of current path for each parameter dictionary
/fillpath
{
    counttomark
    {
        gsave
        setupfillparameters not
        %plain fill of path
        fill
        %else
        { %<mark> . . . <fade array>
            %fadeout of char
            dup length 4 eq
            {
```

APPENDIX A-continued

```
% -- protecthalfprevious --
% Assumes curr path consists only of moveto currentpoint.
% Returns with curr path consisting of only moveto currentpoint.
%
% If there is a "previous" character, create a clipping region
  grestore
  }
  repeat
  pop %pop the mark
  }
bind def % <charstring><mark>[<parameter dict>] . . . fillchar <charstring>
% Render filled version of charstring in current font
% for each parameter dictionary
/fillchar
{
  counttomark
  {
    gsave
    setupfillparameters
    {
      %plain fill of char
      counttomark 1 add index glyphshow
    }
    %else
    {
      % <charstr><mark> . . . <fade array>
      %fadeout of char
      dup length 4 eq
      {
        % Array: Fadeout effect. Setup char as clip, then sweep line
        % [<from color><to color><from line array><to line array>]
        fadepath
      }
      if
    }
    ifelse
    grestore
  }
  repeat
  pop %pop the mark
}
bind def % <charstring><mark>[<parameter dict>] . . . extrudechar <charstring>
% Render extruded version of charstring in current font
% for each parameter dictionary
/extrudechar
       moveto
                                      % Array: Fadeout effect
                                      fadepath
                                      }
                                      if
                                      }
                                      ifelse
                                      }
                                      counttomark
                                      {
                                        gsave
                                        setupfillparameters not
                                        {
                                          %plain fill of char
                                          counttomark 1 add index glyphshow
                                        }
                                        %else
                                        {
                                          % <charstr><mark> . . . <fade array>
                                          %fadeout of char
                                          dup length 4 eq
                                          {
                                            % Array: Fadeout effect. Setup char as clip, then sweep line
                                            % [<from color><to color><from ofs x/y arr><to ofs x/y arr>]
                                            currentpoint
                                            /showy exch def
                                            /showx exch def
                                            /showstr counttomark 1 add index def
                                            aload pop
                                            % find vectors from beginnng to end offset
                                            1 index aload pop 2 index aload pop % . . . xbeg ybeg xend yend
                                            3 -1 roll % . . . xbeg xend yend ybeg
                                            sub /fillydist exch def % . . . xbeg xend
                                            exch sub /fillxdist exch def
                                            pop
                                            aload pop
                                            /exbeginy exch def
                                            /exbeginx exch def
                                            % find distance between endpoints & use
                                            fillxdist dup mul fillydist dup mul add sqrt
                                            /fillmasterdistance exch def
                                            %setup iterator to iterate over master distance
                                            0 fillmasterdistance -1 setuptramp
                                            {
                                              iterateramp %scaled_fillmasterdistance
                                              gsave
                                              fillmasterdistance div %0 . . . 1_fraction
                                              dup fillxdist mul showx add exbeginx add
                                              exch fillydist mul showy add exbeginy add
                                              previouspoint {translate 0 0 moveto fadepath} {pop} ifelse
```

APPENDIX A-continued

```
/showstr load glyphshow
        }
        grestore
      %else
        {exit}
      ifelse
    }
    loop
  } if
  ifelse
  grestore
  pop   %pop the mark
  repeat
bind def % mark [{parameter array | dict}] <isProtected> . . . onlinepath --
% isProtected true if this was called as part of protected outline
% Render online (centered outline) of curr path for each parameter
/onlinepath
{
  /isProtected exch def
  counttomark
  {
    gsave
    dup type /arraytype eq
    dup length 2 eq
    % Array: Set char outline as clip path, then do general
    % fills of said array.
    % <outline params><fade array per fadepath>
      aload pop
      exch setuplineparameters %ignore color
      {strokepath} stopped
        {newpath -1 -1 moveto .010 rlineto 0.01 rlineto closepath}
      if
      dup fadepath   % this may not have filled prev char
      isProtected
      {
      }
      grestore
    }
    bind def % <charstring><mark>[<parameter array>] . . . embosschar <charstring>
%
% Render embossed version of charstring in current font
```

```
      }
    %else
      {pop}
    %felse
    }
  %else
  }
  % Array: Fadeout effect.
  % [<outline params><from color><to color><from wid><to wid>]
    aload pop
    5-1 roll setuplineparameters %ignore width & color
    50 setupramp % actually 100, but linewidth is 2x fade width
    iterateramp
    {gsave setlinewidth stroke grestore}
    %else
      {exit}
    ifelse
  }
  loop
  }
  ifelse
  %else
  {
    % Dict entry → plain inline
    setuplineparameters stroke
  }
  ifelse
  grestore
  }
  repeat
  pop
bind def % mark [parameter dict] . . . <isProtected> inlinepath --
% isProtected true if this was called as part of protected outline
%
% Render online (interior outline) of curr path for each parameter
/inlinepath
{
  gsave
  clip
  onlinepath
    idtransform
    rmoveto
    showstr glyphpath clip
    newpath
    showx showy moveto
    showstr glyphpath
  2 {exch dup 0 lt{1 add}{1 sub}ifelse} repeat
```

APPENDIX A-continued

```
% for each parameter dictionary. Assume light source at 1:30 o'clock
/embosschar
{
currentpoint
/showy exch def
/showx exch def
/showstr counttomark 1 add index def
counttomark
{  %expects array [{fillcolor}{lightcolor}{darkcolor}depth]
aloadpop
/embossdepth exch def
/embossdark exch def
/embosslight exch def
/embossfill exch def
gsave
showstr glyphpath clip
%inline entire char with darklight
mark
1 dict dup begin
  /linejoin 1 def
end
/embossfill load /embossdark load embossdepth 0
5 array astore
false onlinepath   %clip region already setup
%inline lightness while moving clip region
newpath
/embossfill load /embosslight load
embossdepth 0
100 setupramp
{
iterateramp
{
gsave
showx showy moveto
dup
dup mul 2 div sqrt
dup dtransform
% set path up as clip
clip newpath
% Round down scaling factor so that 1 pixel maps to even # dest
% pixels to avoid stitching. Compute tile size while we're at it.
3 index 6 index mul
3 index 6 index mul
dtransform floor exch floor
% Try to round # pixels to be even multiple of scaling factor
dup 1 add 4 index mul dup truncate sub abs .01 lt
  {1 add}
%else
  {dup 2 add 4 index mul dup truncate sub abs .01 lt{2 add}if}
ifelse
setlinewidth stroke
grestore
}
%else
{exit}
ifelse
}
loop
}
grestore
}
repeat
pop %pop the mark
}
bind def
% [image or pict array]pictilepath --
% Path must be current; image is tiled over (-.2, -.25) to. (1, 1)
%
% image array: [{proc}<bits/comp><#comp><x_size> %proc is datasrc
% <y_size><x_scale><y_scale><x_row_ofs_fract>
% <bool:t=word_origin,f=char_origin>]
% draw array: [{proc}<x_size>            %proc is drawing proc
% <y_size><x-scale><y-scale><x-row_ofs_fract>
% <bool:t=word_origin,f=char_origin>]
%
% x & y_size is picture's coord system eg. images' x by y pixels,
% drawings' bbox expressed in drawings' internal coordinates
% x & y_scale is # to scale pict's smallest side back to match 1 .1 x 1.25
% bbox AND shrink it further to desired size within box
%
% Tile path with image
/pictilepath matrix def
/pictilepath
{
gsave
aload pop
{  %proc [bpc ncomp] xsize ysize
currenty endy ge {exit} if
/currentx currentxbase def
{
currentx endx ge {exit} if
gsave currentx currenty translate
2 index xcheck
  {pictmatrix concat 2 index exec} %drawing
%else
  {2 copy 5 index pictmatrix 8 index false 8 index colorimage}
ifelse
grestore
/currentx currenty tilex add def
}
```

APPENDIX A-continued

```
exch idtransform
/tiley exch def %in current space
/tilex exch def
3 -1 roll pop tiley 4 index div 3 1 roll
4 -1 roll pop tilex 5 index div 4 1 roll
% Round down x-row offset to even # pixels
exch tilex mui 0 dtransform round exch round exch idtransform pop
tilex div exch
%Assume we'll start painting at [-.2, -.25] from beginning. Figure
%out origin of tiling pattern
pop %@@@punt on word origin. Assume char
-.2 -.25
transform floor exch floor exch itransform    %start tiling at even pixel
/originy exch def
/originx exch def
% do the tiling from given point to [1,1]
%% proc bpc ncomp xsize ysize xscale .yscale xoffset
/xoffset exch tilex mul def
/currentxbise originx def
/currentx originx def
/currenty originy def
/endx 1 def
/endy 1 def
4 index xcheck not
{exch 1 exch div exch 1 exch div} %pict, not drawing
if
pictmatrix scale pop
/protectedinlineeffect
{
gsave
% get the character's outline into curr path & render outside lines
0 0 moveto
protecthalfprevious
1 index protectedglyphpath
% render the internal lines
mark exch aload pop true inlinepath
grestore
} bind def
% <glyphstr>[outlines] protectedoutlineeffect <glyphstr>
%
% Render character with outlines
/protectedoutlineeffect
{
gsave
   loop
   /currentxbase currentxbase xoffset add dup originx gt {tilex sub} if def
   /currenty currenty tiley add def
}
loop
2 index xcheck{3}{5}ifelse{pop}repeat
grestore
} bind def
% <glyphstr>inlineeffect <glyphstr>
%
% Render character with inlines
/inlineeffect
{
gsave
% show filled char, then get the character's outline into curr path
1 index glyphpath
% render the internal lines
mark exch aload pop false inlinepath
grestore
} bind def
% <glyphstr>protectedinlineeffect <glyphstr>
%
% Render character with inlines
{
grestore
} def
% <glyphstr>[onlines] protectedonlineeffect <glyphstr>
%
% Render character with line on outlines
/protectedonlineeffect
{
gsave
% get the character's outline into curr path & render outside lines
0 0 moveto
protecthalfprevious
1 index protectedglyphpath
0 0 moveto
mark exch aload pop true onlinepath
grestore
} def
```

APPENDIX A-continued

```
% get the character's outline into curr path & render outside lines
0 0 moveto
protecthalfprevious
1 index protectedglyphpath
mark exch aload pop true onlinepath
grestore
} def
% <glyphstr>[onlines] onlineeffect <glyphstr>
%
% Render character with line on outlines
/onlineeffect
{
gsave
% get the character's outline into curr path & render outside lines
0 0 moveto
1 index glyphpath
0 0 moveto
mark exch aload pop false onlinepath
previouspoint
{
protecthalfprevious
gsave
translate 0 0 moveto
1 index previousglyph mark 2 index aload pop fillchar pop
grestore
} if
% get the character's outline into curr path & render fills
mark exch aload pop fillchar
%
grestore
} def
% <glyphstr>[extrudes] extrudeeffect <glyphstr>
%
% Render extruded character
/extrudeeffect
{
gsave
% render extrudes
0 0 moveto
mark exch aload pop extrudechar
grestore
} def % <glyphstr>[fills] filleffect <glyphstr>
%
% Render filled character
/filleffect
{
gsave
% get the character's outline into curr path & render fills
0 0 moveto
mark exch aload pop fillchar
grestore
} def
% <glyphstr>[fills] protectedfilleffect <glyphstr>
%
% Render filled character & half of prev char
/protectedfilleffect
{
gsave
% if there was a prev character, render right half of if
grestore
} if
% render extrudes
mark exch aload pop extrudechar
grestore
} def
% <glyphstr>[embosses]embosseffect <glyphstr>
%
% Render embossedd character
/embosseffect
{
gsave
0 0 moveto
mark exch aload pop embosschar
grestore
} def
% <glyphstr>[image or drawing] tiledpicteffect <glyphstr>
%NB: ACCEPTS ONLY ONE IMAGE/DRAWING, NOT AN ARRAY
%
% Renderaracter filled with image
/tiledpicteffect
```

APPENDIX A-continued

```
% <glyphstr>[extrudes] protectedextrudeeffect <glyphstr>
%
% Render extruded character & half of prev char
/protectedextrudeeffect
{
gsave % if there was a prev character, render right half of if
previouspoint
{
protecthalfprevious
gsave
translate 0 0 moveto
1 index previousglyph mark 2 index aload pop extrudechar pop
% Render font from several different-colored layers in [basefont]
/layereffect
{
% render the same glyph in each base font, changing colors
0 1 2 index length 1 sub
{ %glyphstring [layercolors] number
% set the color for this font
2 copy get
dup type /dicttype eq
% dictionary in layercolor array indicates per-char color
3 index ( ) copy cvn
2 copy known not {pop/default get} if
get
}
if  %glyphstring [layercolors] number colorproc
exec % find the font, possibly derived
basefonts exch get   %glyphstr [layercolors] basefont
PaintType StrokeWidth Encoding 4-1 roll derivefont % set the font & show the desired character
setfont
0 0 moveto
1 index glyphshow
}
for %glyphstring [layercolors]
pop
}
bind def currentdict
end
/Private exch def {
gsave % get the character's outline into curr path & fill it
1 index glyphpath
pictilepath
grestore
}
def
/tiledimageeffect /tiledpicteffect load def %for compat w/old cfn's
%
% <glyphstring>[layercolors] layereffect <glyphstring>
%
2 copy known {2 copy get def}{pop} ifelse
}
1 index /FontInfo get
9 dict begin
/version (001.000)readonly def
/Notice (Copyright \(C\) 1996 John Desrosiers)readonly def
/FamilyName 2 index exec
/Weight 2 index exec
/isFixedPitch 2 index exec
/UnderlinePosition 2 index exec
/UnderlineThickness 2 index exec
/ItalicAngle 2 index exec
/FullName FontName def currentdict         %basefont proc srdict fontinfodict
end
exch pop exch pop
readonly
/FontInfo exch def /FontBBox dup 2 index exch get def
/CharStrings dup 2 index exch get def
/FontMatrix dup 2 index exch get def
/Encoding Private /initialEncoding get def %for the time being
pop % Font's BuildChar proc. Do NOT define BuildGlyph, since char code is needed
% <fontdict><charcode>BuildChar --
/BuildChar
{
exch
begin Private begin
dup 130 ge 1 index 149 le and
{
% Control code. They're broken into 2 ranges 130–9 (param1)
% & 140–9 (param2). Each range is *also* is broken into 2 sub-ranges
```

APPENDIX A-continued

```
/FontType 3 def
/PaintType 0 def
/StrokeWidth 0 def

Private /basefonts get 0 get    %get a copy of 1st base font

% Copy most of FontInfo from the 1st base font
%proc to copy src dict entry if avail: <src dict><key>--><src dict>
%else
  {5 sub /param 12 exch def}
ifelse
}
%else
{
10 sub
/param2 1 index def
dup 4 le
  {/param21 exch def}
%else
  {5 sub# /param22 exch def}
ifelse
}
ifelse
}
%else
{
Encoding 1 index get
/.notdef eq
  % no-op .notdef
{
pop
() previouschar copy pop
}
%else
{                %charcode
currentrgbcolor rgbcolortoentry astore pop %maybe fold current char's case
currentdict /foldcase known
```

```
                % param11, param12 and param21, param22.
                %
                ()previouschar copy pop %control char kills previouschar
                130 sub
                dup 9 le
                  {
                  /param1 1 index def
                  dup4 le
                    {/param11 exch def} if

% remember word beginning if appropriate
()previouschar eq
{
0 0 transform
/beginwordy exch def
/beginwordx exch def
}
if % convert charcode to 1-char string
()dup 0 4 4−1 roll put
/currentchar 1 index def % scale coordinate system back up by inverse of original matrix
basefonts 0 get
dup /FontMatrix get
[0 0 0 0 0 0] invertmatrix concat %font % set the charwidth to the corresp glyph in 1st base font
setfont
0 0 moveto
stringwidth /currentcharwidth 2 index def setcharwidth
0 0 moveto %remember abs coordinates of char's default coord system org
0 0 transform
/originaly exch def
/originalx exch def
```

APPENDIX A-continued

```
{
foldcase /toupper eq
  {
  dup 97 ge 1 index 122 le and
    {32 sub}
  if
  }
if
foldcase /tolower eq
  {
  dup 65 ge 1 index 90 le and
    {32 add}
  if
  }
if
% save characterstring & pos'n as previous
dup xcheck not{exch} if pop %kill off shape proc
previouschar copy pop
/previousy originaly def
/previousx originalx def
  }
  ifelse
  }
 ifelse
 end end
} def %bind will make R/O
FontName currentdict        %key dict
end
definefont pop
                                        % Execute each element of the parameters array. If element
                                        % is executable, just execute it with currentchar as a param;
                                        % else, aload the array & exec the last element.
parameters aload length { } currentchar 3–1 roll
  {
  3–1 roll
  dup xcheck
    {exec}
    %else
    {aload pop exec}
  ifelse
  }
  repeat    %charstr
```

What is claimed is:

1. A computer-readable medium encoded with a data structure for providing a multiple color font ("MCF") for use in rendering characters specified by character code which comprises:

one or more rendering descriptions of how to render the characters specified by character code including color schemes comprised of a plurality of colors and one or more descriptions of shapes of one or more character elements.

2. The computer-readable medium of claim 1 wherein at least one of the one or more rendering descriptions comprises at least one rendering description that includes at least one of a color scheme and a description of a shape of a character element.

3. The computer-readable medium of claim 1 wherein the data structure further includes one or more color schemes, at least one of which color schemes includes one or more colors.

4. The computer-readable medium of claim 3 wherein the data structure further includes one or more descriptions of shapes of one or more character elements.

5. The computer-readable medium of claim 1 wherein at least one of the one or more rendering descriptions comprises at least one rendering description of how to render the characters using one or more of a bitmap and a pixmap.

6. The computer-readable medium of claim 5 wherein the data structure further includes one or more of bitmaps and pixmaps.

7. The computer-readable medium of claim 1 wherein at least one of the one or more rendering descriptions comprises at least one rendering description of how to render the characters using a description of a drawing.

8. The computer-readable medium of claim 7 wherein the data structure further includes one or more descriptions of a drawing.

9. The computer-readable medium of claim 1 wherein at least one of the one or more rendering descriptions describes how to transform one or more of a shape of a character element to a different shape and a color to a different color.

10. The computer-readable medium of claim 1 wherein the at least one of the one or more rendering descriptions describes how to interpolate color.

11. The computer-readable medium of claim 1 wherein at least one of the colors includes transparency.

12. A computer-readable medium encoded with a data structure for providing a multiple color font ("MCF") for use in rendering characters specified by character code which comprises:

an accessible basefonts collection of one or more basefonts, each of which basefonts provides a scalable description of one or more character elements;

an accessible palettes collection of one or more palettes, each of which palettes describes one or more color schemes including a plurality of colors; and an accessible parameters collection of parameters, each of which parameters describes how to render the characters specified by character code with reference to the one or more palettes and the one or more basefonts.

13. The computer-readable medium of claim 12 wherein the data structure further comprises an accessible imagearrays collection of one or more imagearrays, each of which imagearrays comprises one or more of a bitmap of an image and a pixmap of an image;

wherein at least one of the parameters describes how to render the characters using one or more imagearrays.

14. The computer-readable medium of claim 13 wherein at least one of the parameters describes how to render the characters using at least a portion of a pixmap from imagearrays.

15. The computer-readable medium of claim 12 wherein the data structure further comprises an accessible drawingarrays collection of one or more drawingarrays, each of which drawingarrays describes a drawing;

wherein at least one of the parameters describes how to render the characters using one or more drawingarrays.

16. The computer-readable medium of claim 15 wherein at least one of the parameters describes how to render the characters using at least a portion of a drawing described in drawingarrays.

17. The computer-readable medium of claim 15 wherein at least one of the parameters describes how to render characters as a multiplicity of one color renderings.

18. The computer-readable medium of claim 12 wherein the data structure further comprises an accessible hints collection of hints, each of which hints comprises data for use in rendering characters in various resolutions and sizes;

wherein at least one of the parameters describes how to render the characters using one or more hints.

19. The computer-readable medium of claim 12 wherein the data structure further comprises an accessible collection of details, each of which details comprises data for use in rendering the characters;

wherein at least one of the parameters describes how to render the characters using one or more details.

20. The computer-readable medium of claim 12 wherein at least one of the basefonts comprises a one-color font.

21. The computer-readable medium of claim 12 wherein at least one of the basefonts comprises an identifier of a data source of a one-color font.

22. The computer-readable medium of claim 12 wherein at least one of the color schemes comprises a set of color codes.

23. The computer-readable medium of claim 12 wherein at least one of the color schemes includes a color which includes transparency.

24. The computer-readable medium of claim 12 wherein at least one of the parameters describes how to render the characters by repeatedly overprinting.

25. The computer-readable medium of claim 24 wherein the repeated overprinting comprises overprinting with different graphics.

26. The computer-readable medium of claim 25 wherein the repeated overprinting comprises printing successively darker slices of the characters offset from one another.

27. The computer-readable medium of claim 26 wherein the overprinting successively darker slices includes interpolating between a beginning and an ending color.

28. The computer-readable medium of claim 25 wherein the data structure further includes a description of how to determine a step frequency for overprinting.

29. The computer-readable medium of claim 25 wherein the overprinting comprises overprinting utilizing clipping mechanisms.

30. The computer-readable medium of claim 29 wherein the clipping mechanisms include clipping areas having transparency.

31. The computer-readable medium of claim 12 wherein at least one of the parameters describes how to render the characters by saving at least a portion of previously rendered characters.

32. The computer-readable medium of claim 31 wherein the at least one of the parameters further describes how to render a character and the saved at least a portion of previously rendered characters.

33. A system for rendering characters in multiple colors which comprises:
    means for storing multiple color fonts ("MCFs") including information used to render characters in scalable shapes and in color schemes having more than one color;
    means for selecting one of the MCFs;
    means for accessing the selected MCF in response to a request from an application program to print characters on an output device using the MCF; and
    means for rendering characters using the MCF.

34. The system of claim 33 wherein the means for selecting one of the MCFs comprises means for selecting a stand-in font for the MCF.

35. The system of claim 34 wherein the means for accessing the MCF comprises means for substituting the MCF for the stand-in font.

36. The system of claim 33 wherein the means for selecting further comprises means for selecting one of the color schemes.

37. The system of claim 36 wherein the means for selecting one of the color schemes comprises means for mapping sets of colors to specific ones of the color schemes.

38. The system of claim 36 wherein the means for selecting one of the color schemes comprises means for interpreting non-printing control characters to identify one of the color schemes.

39. The system of claim 33 wherein the means for selecting one of the MCFs further comprises means for selecting a background color for use by the rendering means.

40. The system of claim 39 wherein the means for selecting a background color comprises means for interpreting non-printing control characters to identify background color.

41. The system of claim 33 wherein the means for selecting one of the MCFs further comprises means for modifying the selected MCF.

42. The system of claim 33 wherein:
    the MCF comprises a data structure comprised of one or more rendering descriptions of how to the render characters using color schemes comprised of one or more colors and one or more descriptions of shapes of one or more character elements.

43. The system of claim 33 wherein the means for accessing comprises an MCF engine which is an extension to means for operating the system.

44. The system of claim 43 wherein the MCFs are PostScript™ programming language Type 3 format fonts.

45. The system of claim 33 wherein the means for accessing comprises an MCF engine built into means for operating the system.

46. The system of claim 33 wherein the means for accessing comprises an MCF engine attached to the application program.

47. The system of claim 33 wherein the means for accessing comprises a means for executing MCF text formatting instructions and control commands found in network documents accessed over a network.

48. The system of claim 47 wherein a browser displays text in one color as a placeholder until the text is overprinted in multiple colors using the MCF.

49. The system of claim 47 wherein the browser further comprises means for calling a standalone MCF engine that is an extension to means for operating the system.

50. The system of claim 47 wherein the browser further comprises means for calling a standalone MCF engine that is built into the operating system.

51. The system of claim 47 wherein the browser further comprises means for calling a standalone MCF engine over the network.

52. The system of claim 47 wherein the browser further comprises an MCF engine.

53. The system of claim 33 wherein the means for rendering comprises for determining the number of steps to print color and the number of steps to adjust overlap fonts using the resolution of a print engine.

54. The system of claim 33 wherein the means for rendering comprises for rendering colors using color transparency data stored in the MCF.

55. The system of claim 33 wherein the means for storing comprises means for storing files of information to be applied to an MCF when rendering characters.

56. A method for rendering a character identified by a character code on an output device of a system which comprises the steps of:
    using the character code to retrieve a color scheme containing a plurality of colors, character shape data and descriptions of how to render the character from the system; and
    applying the descriptions to the color scheme and the character shape data to render the character in a pixmap.

57. The rendering method of claim 56 wherein one or more of the color scheme, the character shape and descriptions are retrieved from a computer network.

58. The rendering method of claim 56 wherein the step of applying comprises repeatedly overprinting with different graphics.

59. The rendering method of claim 56 wherein the step of applying comprises applying in an extension to a computer operating-environment.

60. A computer-readable medium encoded with a data structure for providing a multiple media font for use in rendering characters specified by character code which comprises:
    one or more rendering descriptions of how to render the characters specified by character code using color schemes comprised of one or more colors, one or more descriptions of shapes of one or more character elements, media information comprised of format information for multiple media output comprised of one or more of animation output, video output, and audio output, and timing information comprised of timing data to control the flow of action of the multiple media output.

61. The computer-readable medium of claim 60 wherein at least one of the one or more rendering descriptions comprises: (a) at least one rendering description of how to render the characters with reference to one or more of a bitmap and a pixmap; and (b) at least one rendering description of how to render the characters with reference to a description of a drawing; and wherein the data structure further includes: (a) one or more color schemes, at least one of which color schemes includes a plurality of colors; (b) one or more descriptions of shapes of one or more character elements; (c) one or more of bitmaps and pixmaps; (d) one or more descriptions of a drawing; (e) one or more media information; and (f) one or more timing information.

62. A computer-readable medium encoded with a data structure for providing a multiple media font ("MMF") for use in rendering characters specified by character code which comprises:

an accessible basefonts collection of one or more basefonts, each of which basefonts provides a scalable description of one or more character elements;

an accessible palettes collection of one or more palettes, each of which palettes describes one or more color schemes including a plurality of colors;

an accessible media collection of one or more media information, each of which media information describes formats for one or more media outputs;

accessible timing collection of one or more timing information, each of which timing information describes control of flow action for media output; and an accessible parameters collection of parameters, each of which parameters describes how to render the characters specified by character code with reference to the one or more palettes; the one or more basefonts; the one or more media information, and the one or more timing information.

* * * * *